May 18, 1971 W. B. GOLDSWORTHY ET AL 3,579,402
METHOD AND APPARATUS FOR PRODUCING FILAMENT REINFORCED
TUBULAR PRODUCTS ON A CONTINUOUS BASIS
Filed April 23, 1968 7 Sheets-Sheet 1

INVENTORS
WILLIAM B. GOLDSWORTHY
ETHRIDGE E. HARDESTY
BY
*Robert J. Schaap*
ATTORNEY

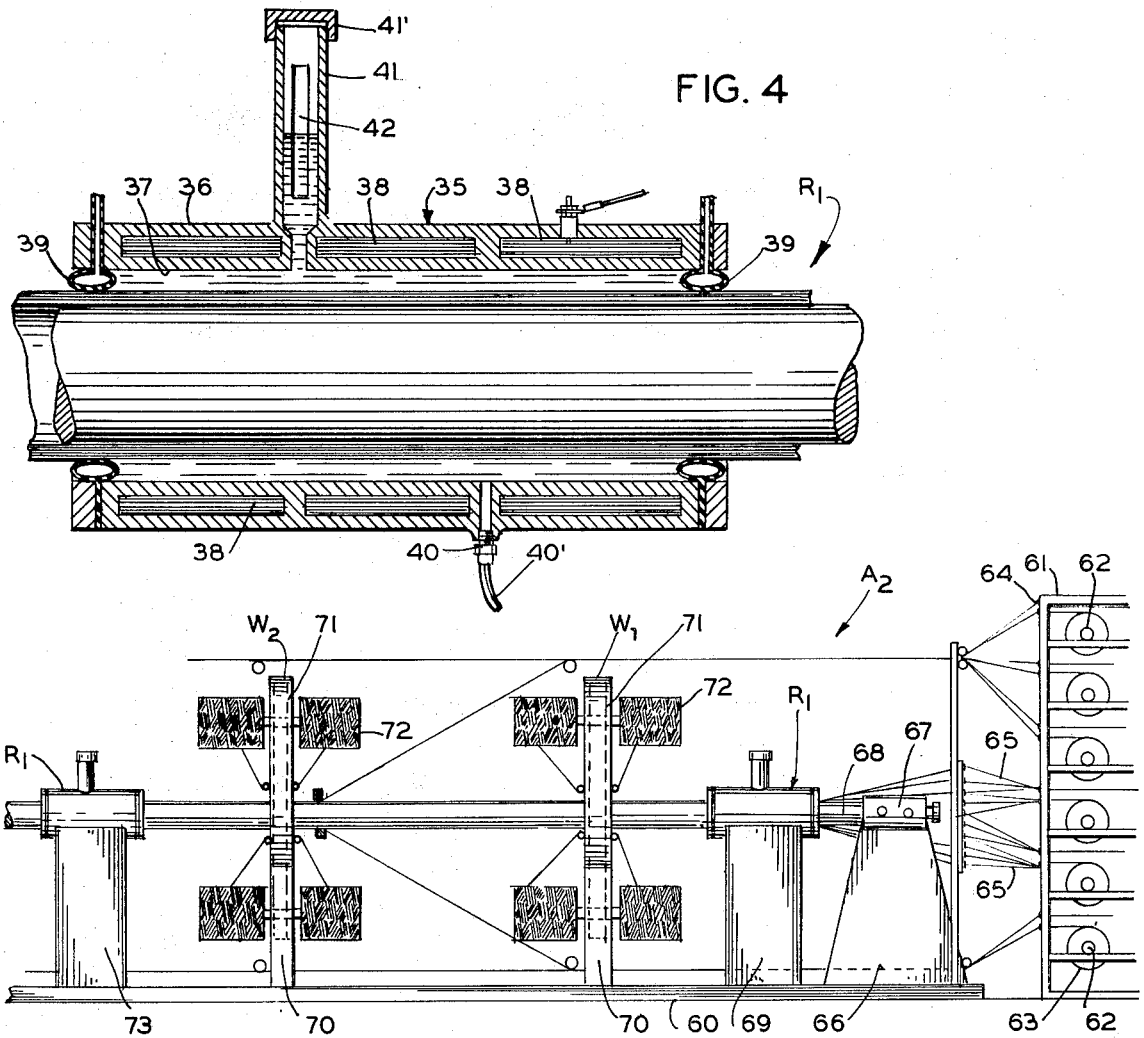
FIG. 4
FIG. 5
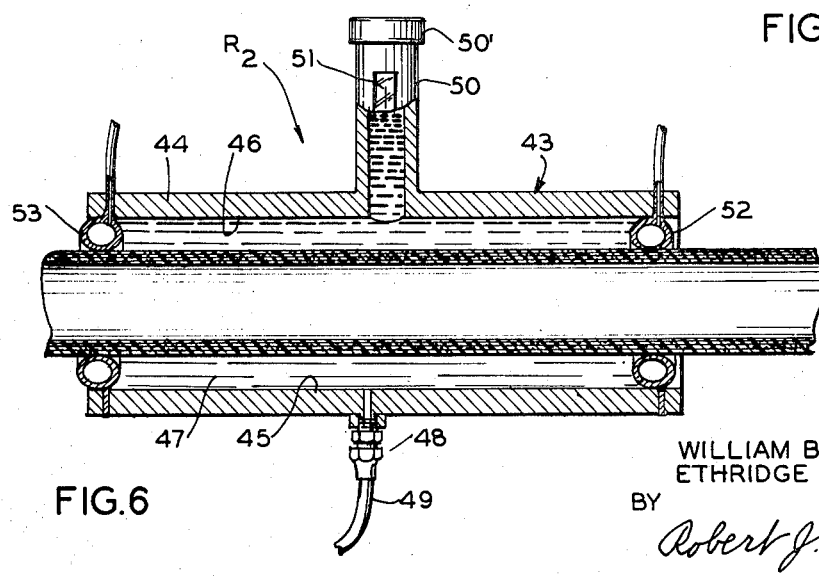
FIG. 6
INVENTORS
WILLIAM B. GOLDSWORTHY
ETHRIDGE E. HARDESTY
ATTORNEY

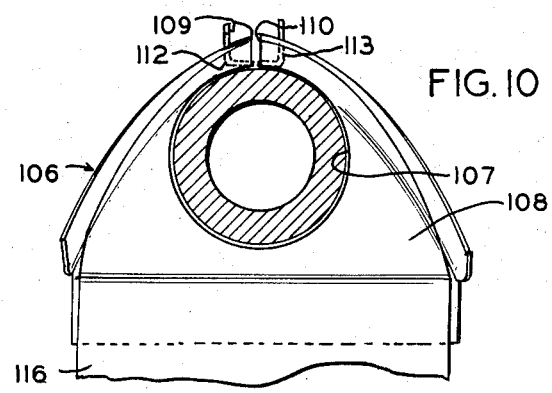
FIG. 10
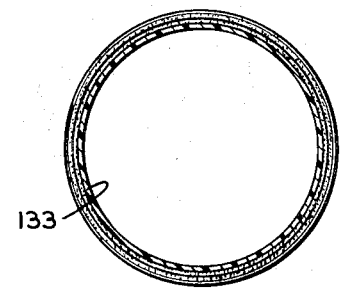
FIG. 13
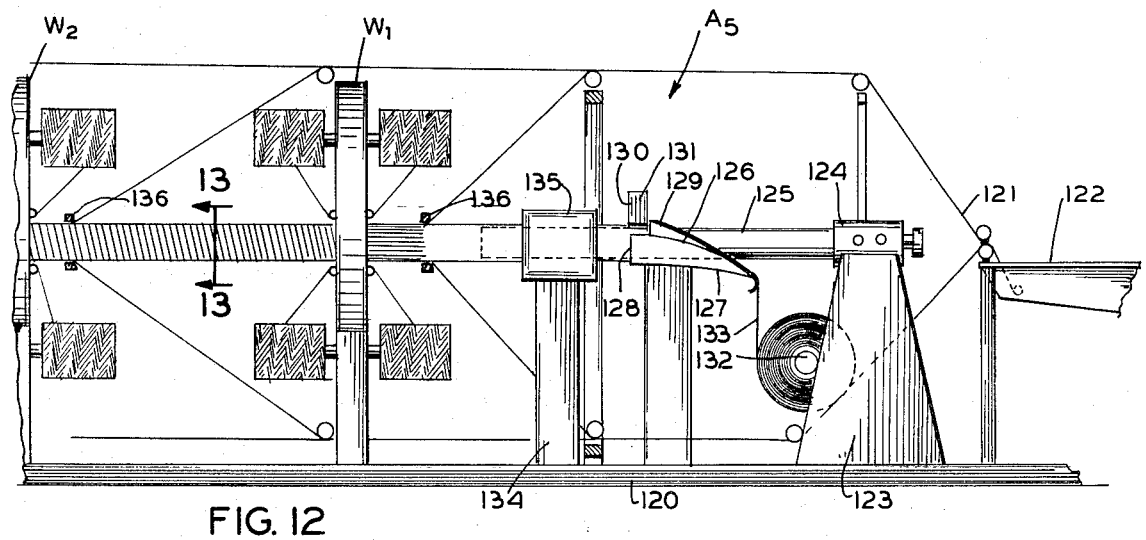
FIG. 12
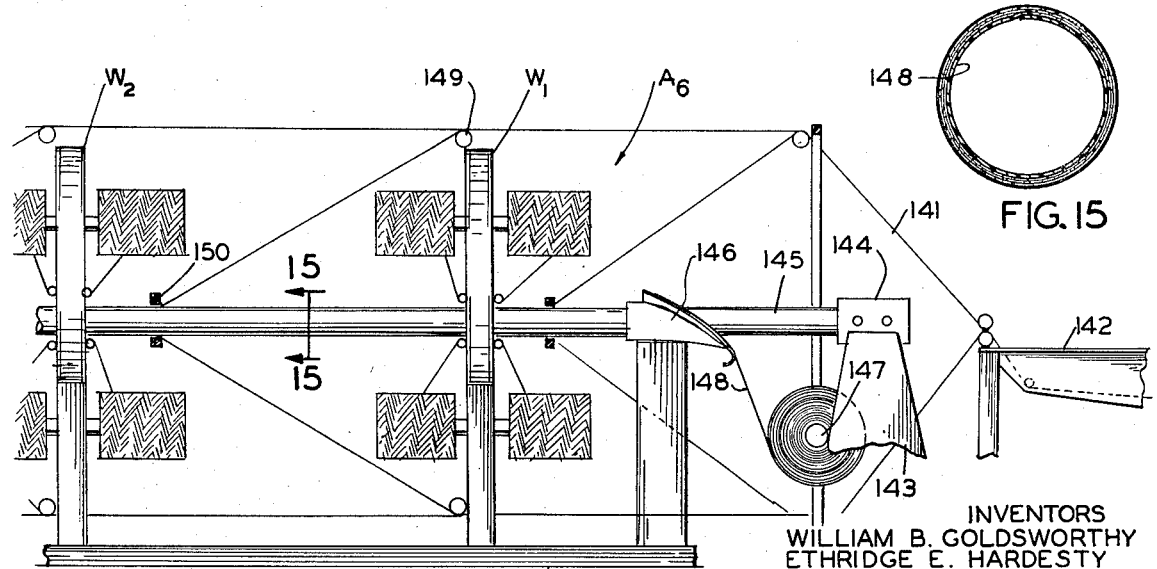
FIG. 14
FIG. 15
INVENTORS
WILLIAM B. GOLDSWORTHY
ETHRIDGE E. HARDESTY
BY
*Robert J. Schaap*
ATTORNEY

INVENTORS
WILLIAM B. GOLDSWORTHY
ETHRIDGE E. HARDESTY
BY

*Robert J. Schaap*

ATTORNEY

May 18, 1971    W. B. GOLDSWORTHY ET AL    3,579,402
METHOD AND APPARATUS FOR PRODUCING FILAMENT REINFORCED
TUBULAR PRODUCTS ON A CONTINUOUS BASIS
Filed April 23, 1968                                    7 Sheets-Sheet 6
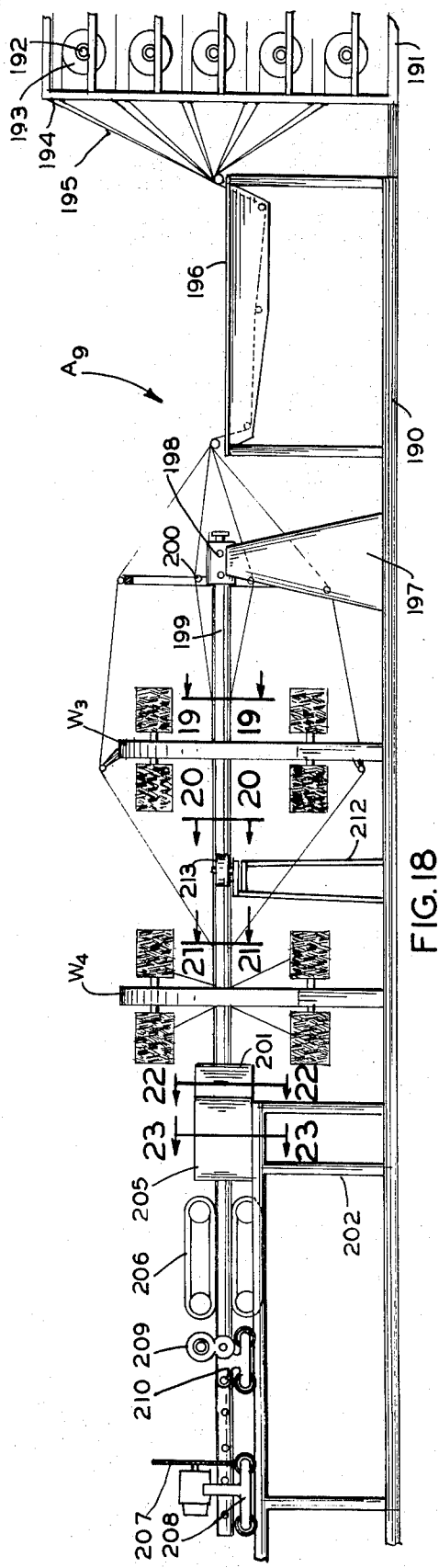
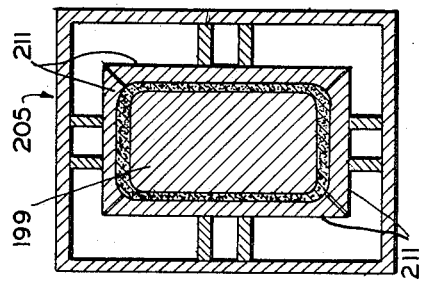
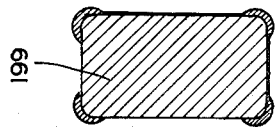
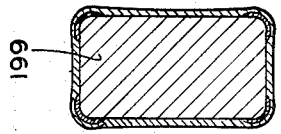
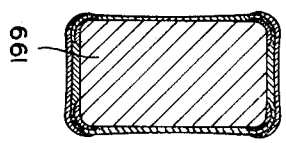
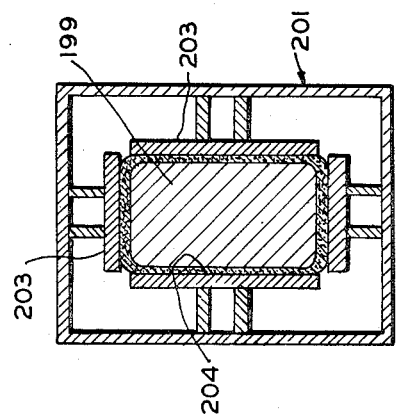
INVENTORS
WILLIAM B. GOLDSWORTHY
ETHRIDGE E. HARDESTY
BY
*Robert J. Schaap*
ATTORNEY

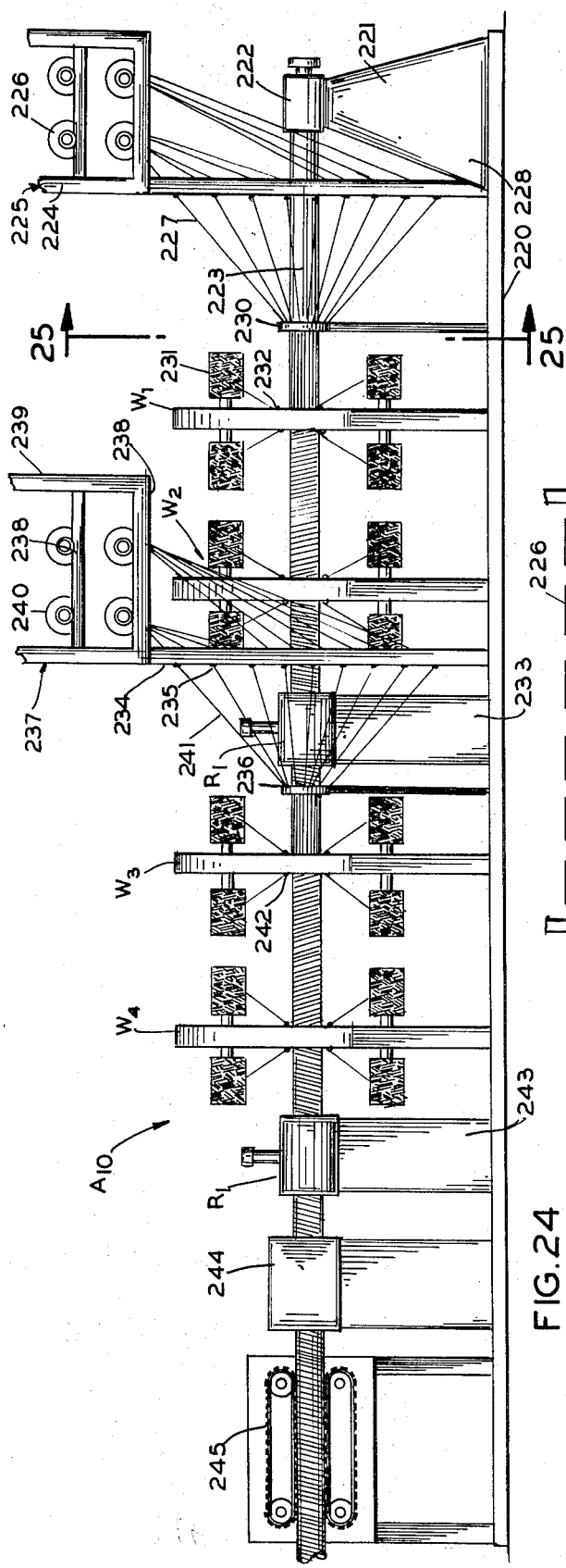
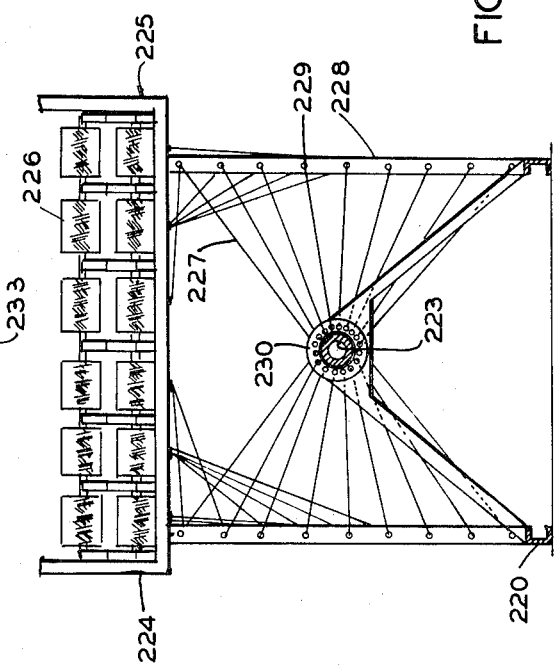
FIG. 24
FIG. 25
INVENTORS
WILLIAM B. GOLDSWORTHY
ETHRIDGE E. HARDESTY
BY
*Robert J. Schaap*
ATTORNEY United States Patent Office 3,579,402
Patented May 18, 1971

3,579,402
METHOD AND APPARATUS FOR PRODUCING FILAMENT REINFORCED TUBULAR PRODUCTS ON A CONTINUOUS BASIS
William B. Goldsworthy, Palos Verdes, and Ethridge E. Hardesty, Pine Valley, Calif., assignors to Goldsworthy Engineering, Inc.
Continuation-in-part of application Ser. No. 633,146, Apr. 24, 1967. This application Apr. 23, 1968, Ser. No. 723,554
Int. Cl. B65h 81/02
U.S. Cl. 156—392
19 Claims

ABSTRACT OF THE DISCLOSURE

A device for making filament reinforced tubular products in a continuous manner. The device includes a series of filament spools. Filaments from the spools are passed through a resin tank and around a fixed mandrel to form the longitudinal strands of the tube. The mandrel has substantially the same internal size and shape of the continuous tube to be produced. The mandrel extends through a plurality of helical filament wrap devices which are designed to apply opposing helically wound strands of filament upon the interspersed layers of longitudinal strands. The mandrel extends also through a pair of circumferential filament wrap devices for laying outermost surface circumferential strands in opposite directions with respect to each other and superimposed upon the helical immediately proceeding final strands. The several layers of such strands which have been wound on the fixed mandrel are urged into the R. F. curing zone on the mandrel which also extends into the curing zone. After the resin matrix has been cured, the finally formed and cured tube is pulled from the mandrel by a pulling unit.

A number of embodiments are disclosed for making continuously wound pipe. In another embodiment, the device is mounted on a moving vehicle such as a boat where pipe which is continuously made is deposited from the moving vehicle. In an additional embodiment of the invention, a rectangular mandrel is employed for wrapping tube-like sections having a somewhat rectangular cross section, capable of being used in the construction of ladder rails and similar structural elements.

---

This application is a continuation-in-part of copending application Ser. No. 633,146, filed Apr. 24, 1967.

This invention relates to certain new and useful improvements in apparatus and method for making a filament reinforced tube, and more particularly, to an improved apparatus and method for forming filament reinforced tubing on a continuous basis and which tubing can be used as fluid piping having high performance characteristics. This tubing is also highly effective in the making of structural elements or in use in any other environment where tubular members are normally employed.

The use, acceptance and reliability of tube and pipe products formed of materials other than metal is rapidly growing. Extruded thermoplastic pipe is being widely employed for service water systems, sprinkler systems and the like. Furthermore, where the thermoplastic resin used in the making of these non-metal pipes has the suitable characteristics, the pipes can be used in the transportation of chemical and waste fluids where metal may be subjected to severe chemical attack and corrosion. Extruded thermoplastic pipe is, however, limited in its ability to contain pressure. Long-run pipe lines must operate at a relatively high pressure. Similarly, domestic service pipe lines which are required to serve locations on hills and mountains must also operate at high pressure. Throughout the chemical industry in particular, fluids are transported in pipe at elevated pressures.

Until recently, only metal pipe was able to withstand liquid working pressures above approximately one hundred pounds per square inch in a one inch diameter pipe. Normally, tap water of the type delivered to consumers is corrosive to metal pipe dependent upon the chemical constituents of the water. Furthermore, most chemicals will attack metal pipe, and sometimes, these reactions may be quite violent and destructive. In order to obviate this corrosion problem, small diameter pipes which were used for conducting fluids at relatively low pressure were made from copper. Pipes with larger diameters were made from steel and stainless steel, but all types required periodic replacement. Furthermore, many of the steel pipes incorporated protective inner linings made from ceramics and thermoplastic materials, rubber, etc. However, the pipe-to-pipe connecting joints were vulnerable since the pipe lining protected only the internal annular wall of the pipe from corrosion and not the connecting joint. The methods for bridging these joints are generally expensive and oftentimes dangerous as well.

The advent of glass filament reinforced pipes was a significant advance in the solution of the problem of containing corrosive fluids at elevated pressures. The glass filaments were laid in the cylindrical wall of the pipe in a manner to resist tension and the normal lines of stress in a pressurized cylinder. Furthermore, the thermosetting resin-binder materials are capable of withstanding the corrosive action of a wide variety of chemicals. Moreover, the glass-reinforced, resin-bound pipe has additional advantage over metal pipe in that it has a higher specific strength, substantially higher corrosion resistance and lower relative cost. In addition, it has a higher degree of reliability not only in the pipe itself, but in the joints as well.

There are a number of commercially available methods of producing filament wound pipe. However, each of the presently available methods and apparatus is only capable of producing discrete, relatively short sections of pipe. These processes are necessarily costly and involve a great deal of labor cost as well as production time for producing fixed-length sections of pipe. There are a few presently available devices and methods for making continuous pipe, but all of these methods suffer some very serious drawbacks. One of these methods employs a continually moving mandrel where succeeding sections of mandrel are attached in endwise abutment and continually fed through a machine where filament is wound thereon. However, the various mandrel sections must be separated so that the cured laminate can be cut into individual sections and removed from the mandrel sections. In another method of producing continuous pipe, an endless metal belt forms a mandrel by twisting the same in a spiral-like configuration so that it resembles the shape of a cured pipe. Thereafter, the filament is wound upon this temporary spiral-like mandrel. However, this device has not proved to be particularly successful. Furthermore, it is quite costly to operate and rather inefficient.

The widespread acceptance of tubular members formed of reinforced plastics has occurred in other industries as well. It has recently been recognized that fiber-reinforced composites can be effectively employed in the manufacture of structural members, such as ladder rails and the like. However, structural members, unlike fluid carrying pipes, do not necessarily have symmetrical cross sections. This is particularly true in the case of ladder rails for example. In the manufacture of ladder rails, it is necessary to have two relatively thick opposed end walls connected by two relatively thin side walls. Other structural members, such as supporting posts which can be formed of reinforced composites also find variability in their cross sections. However, there is no effective commercially available apparatus or method for forming tubular structural members of filament reinforced composites.

OBJECTS

It is, therefore, the primary object of the present invention to provide an apparatus and method for producing continuously formed filament reinforced tubes.

It is another object of the present invention to provide a method and apparatus of the type stated which employs a fixed metal mandrel for receiving the wound strands of filament and which are ultimately cured and removed from the mandrel in a continuous process.

It is a further object of the present invention to provide an apparatus and method of the type stated which is readily and conveniently adaptable to produce pipe of a wide variety of sizes and shapes.

It is another salient object of the present invention to provide an apparatus and method of the type stated which eliminates the costly need for a large inventory of mandrels.

It is also an object of the present invention to produce a high performance filament reinforced pipe which is capable of conducting corrosive liquids at high flow rates, and which is capable of withstanding high internal pressures.

It is an additional object of the present invention to provide an apparatus and method of the type stated which is mounted upon a moving vehicle for continuously depositing pipe from the vehicle during movement thereof.

It is yet another object of the present invention to provide a method and apparatus of the type stated which is capable of making reinforced articles having noncircular cross-sectional shapes, and which articles are capable of being used in the manufacture of structural members.

With the above and other objects in view, our invention resides in the novel features of form, construction, arrangement and combination of parts presently described and pointed out.

FIGURES

In the accompanying drawings (7 sheets):

FIG. 4 is a fragmentary sectional view of a forced resin impregnator forming part of the present invention;

FIG. 5 is a schematic side elevational view, partially broken away of a form of a tube producing apparatus constructed in accordance with the present invention and which employs resin impregnators as opposed to a resin tank;

FIG. 6 is a fragmentary sectional view of a modified form of resin contact impregnator used in the present invention;

Figure 9:
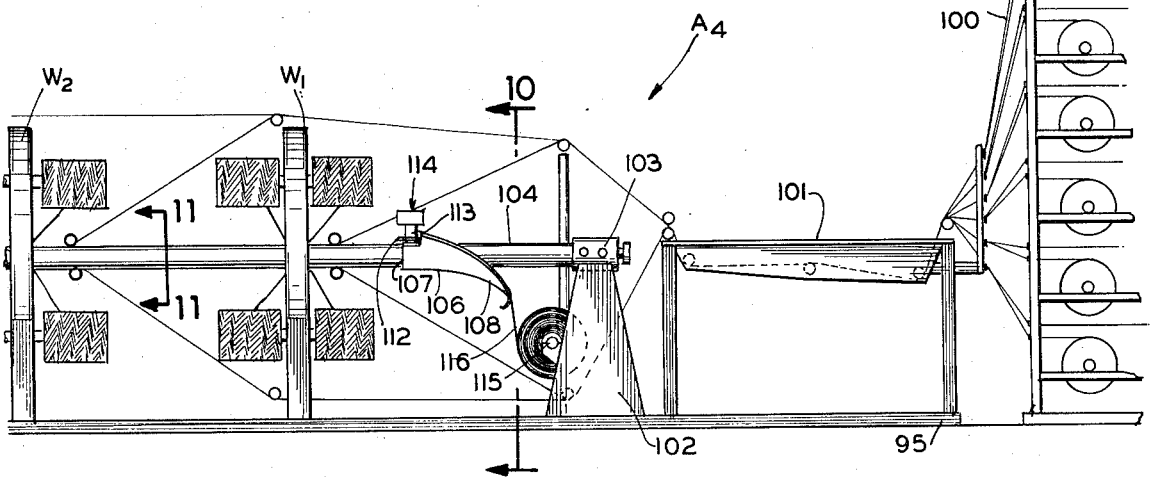
FIG. 9 is a schematic side elevational view, partially broken away and in section, of another modified form of tube producing apparatus which forms a liner about which the filament reinforced strands are wound.
Figure 11:
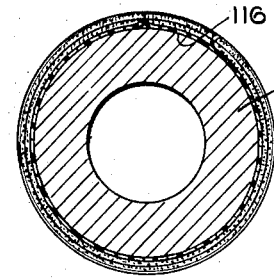
Figure 16:
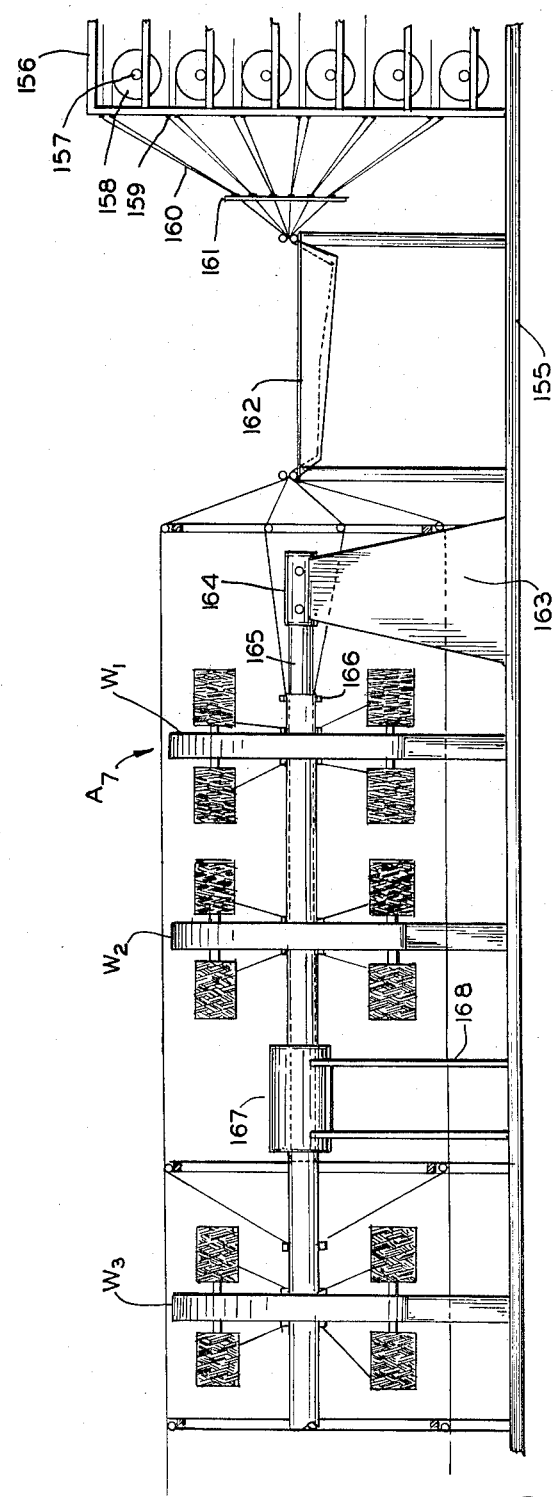

FIGS. 10 and 11 are vertical fragmentary sectional views taken along lines 10—10 and 11—11 respectively of FIG. 9;

FIG. 12 is a schematic side elevational view, partially broken away and in section, of another modified form of tube producing apparatus which employs a mechanism for forming an in-situ type of mandrel from synthetic material and about which filament reinforced material can be wound;

FIG. 13 is a vertical fragmentary sectional view taken along line 13—13 of FIG. 12;

FIG. 14 is a schematic side elevational view, partially broken away and in section, of another modified form of tube producing apparatus similar to the apparatus of FIG. 12, but does not form an in-situ mandrel;

FIG. 15 is a fragmentary sectional view taken along line 15—15 of FIG. 14;

FIG. 16 is a schematic side elevational view of a modified form of tube producing apparatus which forms an in-situ liner by filament winding techniques and which liners thereafter serve as an in-situ mandrel.

Figure 17:
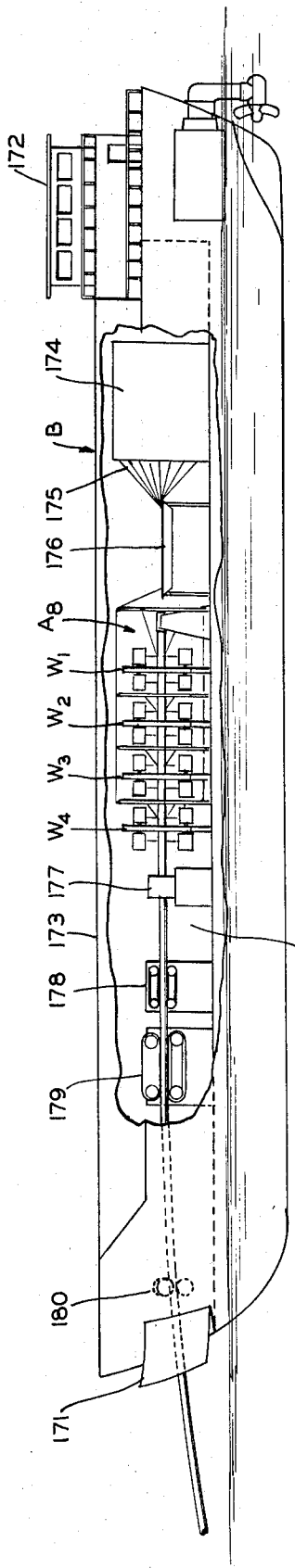

FIG. 17 is a schematic side elevational view showing the employment of a tube producing apparatus of the present invention for producing subaqueous continuously formed filament reinforced pipe on a boat and laying the same in a body of water;

FIG. 18 is a schematic side elevational view, partially broken away and in section, of a tube producing apparatus of the present invention for producing tubular structural shapes;

FIGS. 19–21 are vertical sectional views taken along lines 19—19, 20—20 and 21—21, respectively, of FIG. 18 showing the various steps in the formation of the ladder rails of the present invention, of which;

FIG. 19 shows the application of the longitudinal strands to the corner of the mandrel;

FIG. 20 illustrates the longitudinal strands on the corners of the mandrel with circumferential strands thereabout;

FIG. 21 illustrates the final structure after all strands have been applied;

FIG. 22 is a vertical sectional view taken along line 22—22 of FIG. 18 and showing a portion of the shaping mechanism forming part of the apparatus;

FIG. 23 is a vertical sectional view taken along line 23—23 of FIG. 18 and showing the portion of the curing mechanism of the apparatus;

FIG. 24 is a schematic side elevational view of another modified form of tube producing apparatus of the present invention which employs an overhead supply of longitudinal strand spools; and FIG. 25 is a fragmentary vertical sectional view taken along line 25—25 of FIG. 24.

DEFINITIONS

Many of the terms employed in the filament winding art such as "spiral" and "helical" have been used to describe a variety of situations and consequently have no specific or definite meaning as such. Therefore, in order to ascribe a definite meaning to these terms for the purposes of this application, the following definitions have been set forth:

Longitudinal—A ply of one or more strands arranged substantially axially with a mandrel and generally parallel to the central axis of the mandrel. A longitudinal ply should not deviate by more than a 10° angle from the axial center line of the mandrel; the primary criterion being that this strand satisfies the demand of axial tension.

Helical—A ply of one or more strands wrapped about a mandrel so that it circumscribes the axial centerline of the mandrel and where the angle of the helix formed by the strand ranges approximately from 10° to 85° with respect to the axial center line of the mandrel.

Circumferential—A ply of one or more strands arranged circumferentially about the mandrel and has an angle with respect to the axial centerline of the mandrel approximately from 85° to 95°; the primary criterion being that these strands satisfy a type of burst load demand.

Spiral—A ply of one or more helical strands applied in a form where the band width has a fixed relationship to the helical angle and mandrel diameter such that a continuous solid pattern results where arranged so each of the strands lie side by side in an abutting relationship. (Most of the helical windings in the present invention are in the form of spiral windings; however the term "helical" as used in this application will include "spiral" as well.)

The angles for these above four types of wraps are not necessarily critical as such, and are only set forth in order to define the type of wrap which is being applied. In general, however, where the wrap or ply is designed to provide high burst strength, the wrap is generally a circumferential wrap. Where the wrap or ply is designed to provide component forces to high axial and tensile loads, the wrap or ply is generally a helical wrap. Where the wrap or ply is designed to provide high axial loads, the wrap is generally a longitudinal wrap.

The following terms have also been used with meanings of some vagueness and therefore the following definitions are employed:

Filament—An individual fiber generally for purposes of reinforcement, such as glass, boron, graphite, etc.

End—A group of filaments gathered in the form of a strand, where each of the filaments is essentially placed in parallel disposition and forms a substantially planar band, the number of filaments depending on the material employed. (In normal E fiberglass, 204 filaments are employed in an end.)

Roving—One or more ends arranged normally in a relatively thin flat band. For normal E glass, the roving will have 60 ends, such as a 60-end roving.

Strand (band)—One or more rovings arranged in essentially parallel disposition to form a thin flat band.

GENERAL DESCRIPTION

The present invention relates to a method and apparatus for the production of filament reinforced tubular members on a continuous basis having both circular and noncircular cross-sections. The apparatus generally comprises a creel having a plurality of roving spools for providing individual longitudinal filament strands. The strands are passed through eyelets on the creel and into a resin or matrix tank containing a matrix-curable material. The resinous material impregnates the strands of filament for ultimate cure in a manner to be hereinafter described in detail. After the individual strands have been impregnated, they are passed forward and between a plurality of winding stations.

The device comprises a plurality of circumferential or helical winding stations which generally include a rotating disc. Filament spools are mounted upon oppositely presented flat surfaces of the disc and the disc is rotated by means of a power source during the winding operation. An A frame supports a trunnion-fixed mandrel in a substantially cantilever position. The strands which pass from the resin tank are disposed longitudinally along the mandrel.

In the production of filament reinforced tubes, a plurality of first helical strands are wound upon the longitudinal strands at the first winding station. Thereafter, a plurality of helical strands which are reversed to the helix of the first winding station are wound about the tube being formed at the second winding station. This triad of longitudinal strand additions and the helical winding stations may be repeated in order to form a tube with a desired wall thickness. Reversely located circumferential strands may be wound upon the formed tube at the final two winding stations. It is possible to provide any number of winding stations desired and to apply the desired type of wrap at each of these winding stations. In addition, it is possible to apply longitudinal strands at points disposed between one or more of these winding stations.

The tube which is being formed on the fixed mandrel extends into an R-F curing unit where the matrix is hardened. Thereafter, the tube extends outwardly of the curing unit and into a pulling unit. The pulling unit is designed to continuously pull the tube off of the fixed mandrel as the tube is being formed thereon. In some applications of using the tubing where the tubing is being payed out at a controlled rate of speed it may be desirable to employ a braking unit which is designed to control the speed of dispensing the continuously formed tube. This tubing which can be formed of desired wall thickness is generally adaptable for use as pipe for transporting fluid. By regulating the location and type of winding stations which are employed in the apparatus, it is possible to produce high pressure pipe or low pressure pipe, or more specifically, pipe of the desired performance characteristics.

The present invention also provides a type of tube winding apparatus which employs a forced resin impregnator as opposed to a resin tank. In the forced resin impregnator, the formed tube is passed through a sleeve which contains a series of sonic drivers. The resin is introduced into the interior of the sleeve and is urged into the windings forming the tube by means of the sonic drivers. As another embodiment in the present invention, a contact resin impregnator is employed. In this case, the resin is merely introduced to the surface of the windings on the tube wall and is allowed to soak into the windings. Inflatable air seals may be used on the ends of each of the sleeves. The present invention provides an apparatus which employs either of these impregnators as opposed to the resin tank. These impregnators may be located after each of the winding stations or selectively after a number of winding stations as desired.

The present invention also contemplates a continuous tube forming machine which includes an extruder. The extruder is designed to extrude pipe or tubing which would serve as a liner about which filament reinforced strands can be wound. Furthermore, there is no need to employ a fixed mandrel in this type of apparatus inasmuch as the extruder provides a fairly rigid tube which, in essence, serves as an in-situ mandrel.

As another modification of the present invention, an apparatus is provided which forms a liner of a synthetic resinous material about a fixed mandrel. Thereafter, the desired number of winding stations may be employed in order to wrap the strands of filament reinforced about the liner. As another modification, the liner can be resin impregnated and hardened so that it in essence serves as an in-situ mandrel. As an additional modification, the liner may not necessarily be cured but may be sealed along its longitudinal margins. In the case where the liner is not sealed and cured, it is necessary to employ a fixed-mandrel which extends at least into the curing unit.

The present invention also provides an embodiment where any of the aforementioned tube forming apparatus may be mounted on a moving vehicle such as a boat. As the tube is formed on the boat, it can be continuously laid as the boat moves. In the case of a land vehicle, the vehicle would be moved at the speed which is commensurate with the rate of production of the piper so that the pipe or tube, which may serve as pipe, can be continuously paid out. In the case of a boat, the pipe is continuously and subaqueously dispensed during the movement of the boat.

In another preferred embodiment of the present invention, a fixed mandrel which is rectangular in cross-section is employed. On this type of mandrel, it is possible to form ladder rails which are used in the construction of ladders. In the manufacture of rectangular ladder rails, it is desirable to provide relatively thick opposed end walls connected by substantially thinner side walls. The apparatus of the present invention readily lends itself to the production of other structural members.

DETAILED DESCRIPTION

Apparatus for producing reinforced pipe

Referring now in more detail and by reference characters to the drawings which illustrate practical embodiments of the present invention, $A_1$ designates an apparatus for producing high performance continuously wound filament reinforced pipe. The apparatus $A_1$ can be mounted on a vehicle so that it is essentially mobile and utilized for operation from the bed of a wheeled vehicle, floating vessel, sled, or other movable vehicle. In addition, the apparatus $A_1$ is capable of being mounted in a stationary position and furthermore operated in either a vertical or horizontal position or any desired attitude.

The apparatus $A_1$ generally comprises a base plate 1 and mounted upon one end thereof is a spool rack 2 having a series of transversely extending spindles 3 for accommodating conventional spools of filament or so-called "roving" 4. A separate eyelet 5 is provided for each of the spools 4 and the strands of filament 6 from each of the spools 4 are trained through the eyelet 5 associated with each spool.

Any continuous filament capable of being bent to conform to the cylindrical surface of a geometrically cylindrical body of revolution can be employed in the present invention. The most preferred filament employed in the present invention is that made of glass. However, it should be recognized that filaments formed of carbon, quartz, graphite, asbestos, aluminum, etc. can be effectively used. Filaments formed of lithium and other grown-whisker crystals can also be employed. In addition, metal wire may be interspersed with the glass filaments in the event that it is desired to add some type of metallic body to the fiberglass reinforced pipe which is produced, such as for electrical conductivity.

Figure 1:
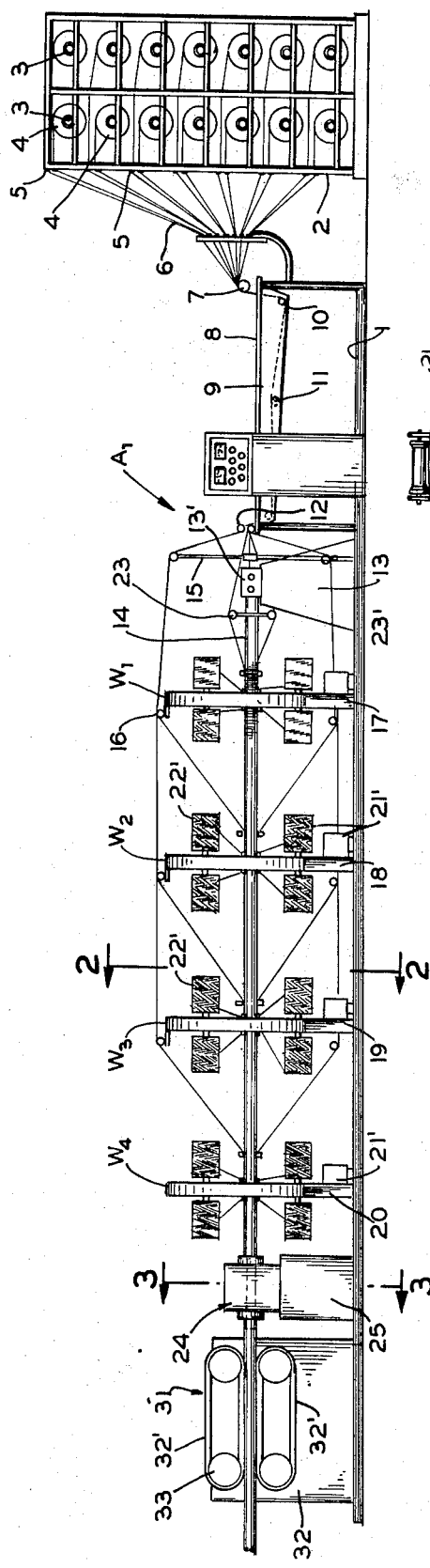
FIG. 1 is a schematic side elevational view, partially broken away and in section, of a tube producing apparatus for producing filament reinforced tube of the present invention.
Figure 2:
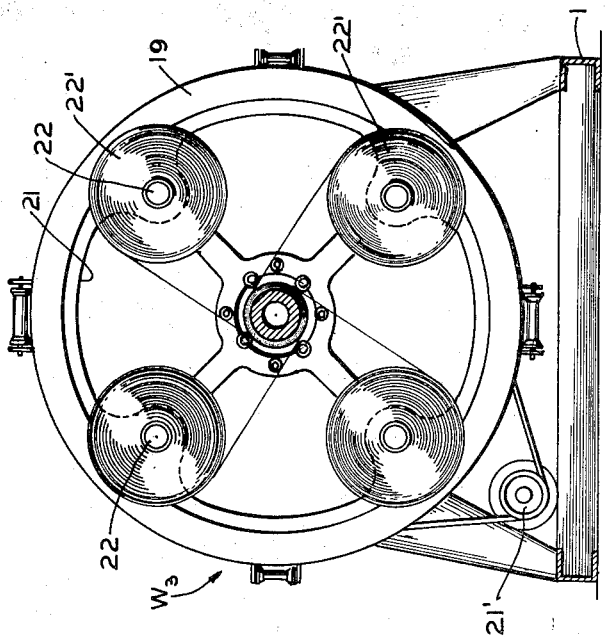
FIG. 2 is a vertical sectional view taken along line 2—2 of FIG. 1.

The various strands 6 of each of the filament spools 4 are passed over a roller 7 which is mounted on a resin tank 8, the latter being secured to the base plate 1 in the manner as illustrated in FIG. 1. The various strands 6 are transversely spaced across the roller 7 and are passed into a trough 9 forming part of the tank 8 and which contains a liquid resin. Furthermore, the strands are retained in the liquid resin bath by means of a hold-down roller 10. At the opposite end of the tank, the strands are held into the liquid bath by means of a hold-down roller 11. Thereafter, the strands are moved upwardly from the liquid resin bath and over a transversely extending roller 12, similar to the roller 7. A pair of squeeze rollers could optionally be employed. The resin tank 8 is conventional in its construction and therefore the details of construction of this tank are not described in further detail herein.

Any material which is capable at some stage of the process of being liquefied and softened for a period of time may be employed as the resin binder or so-called "matrix." The matrix should be sufficient to flow into the filament and fill the interstices between adjacent filaments and layers thereof before achieving a rigid state through cooling or completing polymerization to become a rigid solid. Furthermore, the matrix should possess the ability to adhere to the reinforcement. Some examples of the suitable binders or matrix which can be employed in the present invention are various thermoplastic resins, such as nylon, polyethylene, polypropylene, many of the polycarbonates, polyesters, etc. In addition, thermosetting resins such as polyesters, many of the phenolics and epoxy etc. can be used. Generally, the thermosetting resins should be capable of being fused into an insoluble, non-heat softening mass upon application of heat or similar method of triggering the catalytic system. Other binders or matrices are hard waxes, eutectic ceramics, eutectic metals, synthetic rubbers, etc.

Rigidly mounted on the base plate 1 and being longitudinally spaced from the resin tank 8 is an upstanding stand 13 having a trunnion 13' for supporting a forwardly extending mandrel 14 in a cantilever position, reference being made to FIG. 1. Also mounted on the base plate 1 are four longitudinally spaced inverted U-shaped filament supporting brackets 15 for carrying longitudinal strands of the filament after they leave the resin tank 8. The U-shaped support brackets 15 are provided with four substantially circumferentially spaced eyelets 16 for accommodating the longitudinal strands of roving, for a purpose to be more fully described in detail hereinafter.

Also mounted on the base plate 1 are four longitudinally spaced spool support frames 17, 18, 19 and 20. Each of the spool frames 17–20 houses a circular spool support plate 21 and which is rotatable by means of conventional electric motors 21' through a gear driven system (not shown). In essence, the spool support wheels may be provided with a peripheral pinion gear which can conventionally match with a spur gear mounted on the drive shaft of the motor 21'. A sprocket and chain type drive may also be employed. Inasmuch as this type of drive is conventional, it is neither further illustrated nor described in detail herein.

Rotatably mounted on each of the spool support plates 21 and extending outwardly from both of the planar surfaces thereof are spindles 22 for supporting conventional spools of roving 22', which are substantially identical to the spools of roving 4. Furthermore, each of the plates 21 is designed to carry four to ten circumferentially spaced spools on each of the planar surfaces or a total of 8 to 20 spools on each plate. The terminal ends of the roving are threaded through eyelets or so-called "redirects" to a final placement eye (not shown) which may be supported on any conventional structure.

It should be recognized that it is not necessary to provide the mandrel 14 with any coating. In the case of the present invention, it has been found that a highly polished chrome surface mandrel is also very effective. With many fibers, it is not all necessary to even polish the mandrel. It is also desirable to form the mandrel with a very slight taper so that the free end of the mandrel is slightly diametrally smaller than the supported end thereof. The taper should end at the point where the mandrel enters the curing zone, hereinafter described. This taper on the mandrel will serve to relieve any constriction of the strands which are wound thereupon.

By further reference to FIG. 1, it can be seen that the upstanding frames 17 and 18 constitute first right and left hand helical wrap stations $W_1$ and $W_2$ respectively. The support frames 19 and 20 with the winding spools thereon constitute circumferential winding stations $W_3$ and $W_4$ respectively.

The mandrel 14 is the inner-surface-defining and major support element for producing the continuous pipe of the present invention. It can be made from any suitable material capable of withstanding axial pull experienced during the operation and the abrasion sustained by the scrubbing action to the uncoated fiberglass reinforced elements moving along the length thereof. The mandrel, or a particular section thereof, must also be compatible with curing media to be hereinafter defined and with the method of curing employed for any particular product. Furthermore, the mandrel may be coated with a suitable smooth surfaced exterior liner such as a tetrafluoroethylene polymer marketed under the trade name "Teflon" or ceramic metals or so-called Cermets such as high alumina/silica. It should be recognized that while the mandrel 14 is circular in vertical cross section, the mandrel may be made of any desired cross section in order to produce tubing of a particular cross-sectional shape.

The pipe of the present invention is produced by applying a series of longitudinal strands to the mandrel 14 directly from the roller 12. These strands can be carried over an upstanding guide 23 which is mounted on the trunnion 13 in the manner as illustrated in FIG. 1. Furthermore, the strands are trained through a locating plate or so-called "carding plate" 23' for proper location and placement on the mandrel 14. The carding plate 23' is preferably in the form of a ring circumferentially disposed about the mandrel 14 and has an aperture for each longitudinal strand applied to the mandrel. The plate 23' may be supported by any conventional supporting structure (not shown). The purpose of these initial longitudinal strands is to prevent constriction and binding to the mandrel of any helical or circumferential strands which are subsequently applied. In addition, the longitudinal strands serve as pulling elements capable of receiving the axial band when the tubular member being formed is pulled along the mandrel. These initial longitudinal strands can be applied so that the latter windings of the circumferential, helical and spiral type do not contact the exterior surface of the mandrel 14. Similarly, sufficient longitudinal strands can be circumferentially disposed about the mandrel 14 so that they substantially envelop the latter.

Thereafter, at the first winding station, a series of helical windings are wound upon the exterior surface of the initial longitudinal strands. It can be seen that the filament from each of the spools can be trained through suitable eyelets or so-called "redirects." A separate eyelet will be provided for each spool of roving. At the second winding station $W_2$, a reversely wound helical wrap is applied to the exterior surface of the first helical wrap. At the third winding station $W_3$, a first circumferential wrap is wound about the exterior surface of the helical wrap. Following this, an additional layer of circumferential strands is applied to the thus formed tube at the last winding station $W_4$. This last layer of strands is applied in a direction reversed to the direction of the application of the circumferential strands at the station $W_3$. In the alternative, it can be seen that another layer of longitudinal strands may be applied to the surface of the first helical wrap prior to the application of the second helical wrap at the winding station $W_2$. It is to be noted that each of the strands from spools 22' on each side of the plate 21 are applied to the mandrel 14 at the same point.

While the apparatus $A_1$ has been illustrated as having four winding stations $W_1$–$W_4$, it should be understood that any desired number of winding stations may be employed. For example, in the case where it is desired to produce high pressure pipe, it may be desirable to employ six to eight or more winding stations. Furthermore, while the winding stations $W_1$ and $W_2$ have been described as helical winding stations and the winding stations $W_3$ and $W_4$ have been described as circumferential winding stations, it should be understood that other types of windings could be obtained at these stations. For example, it may be desirable to employ one station with a circumferential wrap, another station with a helical wrap and a third station with a circumferential wrap, or any combination of these three in various forms. Accordingly, the present invention is not limited to any specific number of winding stations, and furthermore, is not limited to any desired form of wrap. In addition to this, it should be recognized that longitudinal strands can be introduced into the formed pipe between any one or more of the winding stations. However, for purposes of illustrating the present invention, it can be seen that longitudinal strands are introduced prior to the first winding station and are also introduced at each of the subsequent winding stations, namely stations $W_2$–$W_4$.

In the most preferred embodiment of winding, it is desirable to initially apply a series of longitudinal strands which substantially circumferentialy envelops the mandrel. Thereafter, the first helical wrap is applied in one direction at a first winding station and a second helical wrap is applied in a reverse direction and a second winding station. This triad of longitudinal and first and second helical strands may be repeated any number of times as desired in order to build up the wall thickness of the tube to be formed. The circumferential winding stations are generally applied at the very end of the apparatus. However, it may be desirable to add additional circumferential windings at any stage during the winding process in order to build up the brust-strength of the tube wall.

In the production of high performance filament reinforced pipe, it is at times only necessary to employ two winding stations in addition to the wrap of longitudinal strands. In the case of high performance pipe, the innermost layer must consist of longitudinal strands which substantially envelop the circular mandrel. The longitudinal strands generally lie directly on the mandrel surface as the first structural layer. The first longitudinal layer of strands must lie parallel to the axis of the mandrel and must be uniformly distributed about the circumference of the mandrel. These strands serve as in-process tension elements to pull the being-fabricated pipe-wall structure along the mandrel. They remain in the structure to contribute their proportional share to the necessary component of longitudinal strength necessary to the containment of pressure in a cylinder. At the first winding station, a first helical wrap is employed and then strands are wrapped about the mandrel at an angle of approximately 45°. At the second winding station, a second helical wrap is disposed upon the surface of the first wrap and this wrap is located at an angle of 45°, but in opposite directions to the first helical wrap. In addition, it is sometimes desirable, in the case of suspended pipe, to insert another longitudinal wrap at a point in between each of the two helical wrap stations. The type of pipe produced by this wrapping pattern has been found to be very suitable for use in high pressure operations. In high pressure pipe, addition layers of circumferential strands may be added to cover the demand of additional burst strength.

Figure 3:
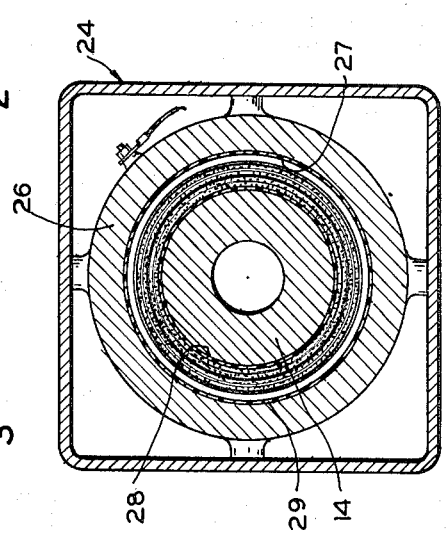
FIG. 3 is a fragmentary sectional view taken along line 3—3 of FIG. 1, showing a portion of the R-F curer of the present invention.

By reference to FIGS. 1 and 3, it can be seen that the mandrel 14 extends into a suitable curing device 24, which is operatively mounted on a stand 25, the latter being rigidly secured to the upper surface of the base plate 1. It is possible to use radio frequency curing or sonic curing for the purposes of the present invention. One particular radio frequency or so-called "R-F" heating unit which can be used in the present invention is more fully illustrated in FIG. 3. In this heating unit, it can be seen that the mandrel extends into the unit for the entire effective length thereof. A short section of aluminum pipe 26 is circumferentially disposed about the mandrel 14 in the manner as illustrated in FIG. 3 and provides an annulus 27 therebetween. Actually, the metallic mandrel serves as the one electrode and the aluminum pipe serves as the other electrode. By a suitable R-F generator (not shown) it is possible to attain the desired radio frequency existing in the annulus 27 and thereby cure the wrap of filament strands disposed upon the mandrel 14. The exterior surface of the mandrel 14 and the interior surface of the aluminum pipe 26 may be provided with Teflon layers 28, 29, respectively as illustrated in FIG. 3. The present invention is not limited to the particular R-F curer illustrated and described herein but could be any of the R-F or sonic curing units described in the W. B. Goldsworthy copending application, Ser. No. 548,347, filed June 23, 1967.

The curing unit 24 is designed to obtain softening or melting and for activating the catalysis system in a thermosetting resin. Generally, the method of heating is chosen to provide the correct energy for heating a particular material. It is also possible to employ infrared heating, or heated air or gas in some systems. However, it has been found that radio frequency heating is far more advantageous for the purposes of the present invention, since these units are capable of curing the resin in the formed tubular member in a very short time period. Therefore, the problem of removing the pipe from the mandrel has been substantially eliminated. While it is possible to employ heated air or gas or infrared heating with some composites, many of the composites are in essence thermally insulative and will only effectively cure with R-F or sonic curing techniques. The radio frequencies generator usually operates in the VHF or UHF range. This latter method of dielectric heating is similar to that described in the W. B. Goldsworthy U.S. Pat. No. 2,871,911 and generally employs frequencies such as 13.5 megacycles, 27.1 megacycles and 40.6 megacycles. However, it is also possible to use 74 and 100 megacycles or 1940 and 2450 megahertz.

It is possible to use an alternate type of radio frequency curing, which is not shown, such as by having a series of electrically charged rods, with alternating ground and positive potentials. It is also possible to use a sonic curing system (not shown). In this case, a sonic generator would be used to create the proper energy level necessary to cure the resin matrix. This latter type of system is conventional in its construction and is therefore neither illustrated nor described in detail herein. As used herein, the term "sonic" is not limited to that energy source which is within the normal hearing range, namely 16 cycles per second to 16 kilocycles per second. The term "sonic" also includes the subsonic range which is approximately 0 to 16 cycles per second, the ultrasonic range which is approximately 17 kilocycles per second to 780 kilocycles per second and the hypersonic range which is approximately 1 megacycle per second to 15 megacycles per second, as well as the sonic range.

The cured pipe is continuously pulled from the mandrel 14 by means of a pulling unit 31, which is schematically illustrated in FIG. 1. The pulling unit 31 is conventionally mounted upon a stand 32, the latter being secured to the base plate 1. The pulling unit 31 comprises a pair of continuous belts 32', which are operatively mounted on drive rollers 33, and are disposed on opposite sides of the pipe which is thus formed. The pulling unit 31 must necessarily have sufficient pulling force to overcome the friction of the pipe on the mandrel 14. However, since the amount of space required due to the uniqueness of the heating and of the closeness obtained in the various winding stations, the length of the mandrel is not unduly long. Furthermore, the resin itself provides a type of lubricating activity so that the pipe, which is thus formed on the mandrel 14 and cured in the curing unit 24, can be easily removed from the mandrel 14 by means of the pulling unit 31.

Resin impregnators

It is possible to eliminate the resin tank 8 and substitute therefor resin impregnators of the type illustrated in FIGS. 4 and 6. Referring to FIG. 4, $R_1$ designates a forced resin impregnator generally comprising an open ended tubular housing or so-called "canister" 35 which is circular in vertical cross section and includes a relatively thick annular wall 36 having a central bore 37. The annular wall 36 is provided with a series of axially spaced circumferentially disposed circular plates 38 which serve as force transducers or so-called "sonic drivers." Each of the plates 38 are in turn connected to a suitable sonic energy generator for generating the necessary energy to drive the resin into the tubular member passing into the housing 35.

At each transverse end, the interior surface of the annular wall 36 is provided with a neoprene rubber seal 39 having an internal diameter which is sufficient to enable a filament wound tube to pass therethrough. By reference to FIG. 4, it can be seen that the seals 39 are sized to accommodate the tube as it passes through the housing 35. Furthermore, the seals 39 are sufficiently flexible to yield in order to accommodate nonlinearities in the circular dimension of the tube passing through the housing 35. The seals 39 are also sufficiently rigid to maintain a substantially fluid tight engagement between the surface of the tube and the interior of the housing 35. While the distance existing between the exterior surface of the tube and the interior surface of the annular wall 36 has been illustrated as being rather large, this illustration is only for purposes of describing the present invention. However, it should be recognized that this annulus has a substantially small thickness and that the exterior surface of the tube is only very slightly spaced from the interior surface of the wall 36.

The housing 35 is also provided with a fitting 40 and a tube 40' connected to a suitable source of liquid resin (not shown). In this matter, it is possible to continually supply a resin matrix to the housing 35. In like manner, the housing 35 is also provided with an upwardly extending hollow standpipe 41 which serves as an air accumulator. The standpipe 41 is provided with a removable cap 41' and a sight glass 42 which extends for the greater portion of the vertical length of the standpipe 41. Air which has been entrained in the various strands of the filament will be displaced by the liquid resin as the strands enter into the housing 35. This air will be normally biased into the standpipe 41 where it will displace and force downwardly the liquid resin therein. The amount of the displaced air which has accumulated in the standpipe 41 can be observed through the sight glass 42 from time to time. After a sufficient quantity of air has been accumulated, the cap 41' can be removed for bleeding off the accumulated air. As this occurs, the standpipe will normally be filled with the resin under pressure. It can be observed that the same pressure conditions will always be maintained within the housing 35 regardless of the amount of air which has been accumulated in the standpipe 41.

A contact resin impregnator $R_2$ is more fully illustrated in the vertical sectional view of FIG. 6. The resin impregnator $R_2$ generally comprises an open ended tubular housing 43 which is circular in vertical cross section and has an annular side wall 44 with a central bore 45. The housing 43 is provided with an interior annular side wall 46 which is slightly spaced from the exterior surface of the tube passing through the bore 45 thereby forming an annulus 47 therebetween. The housing 43 is also provided with a fitting 48 and a flexible tube 49 connected to some suitable source of resin matrix (not shown). In like manner, the housing 43 is also provided with an upstanding standpipe 50 having a removable cap 50' for accumulation of entrained air. The standpipe 50 is also provided with a sight glass 51 for observing the amount of air which has accumulated therein.

At each of its transverse ends, the housing 43 is provided with inflatable seals 52, 53. The seals 52, 53 are conventional in their construction and may be provided with a nipple or similar valve structure for providing an air seal. The seals may be inflated to engage the tube passing through the bore 45 with the desired amount of pressure on the tube. The rear seals 52 are inflated generally with a low air pressure source in order to maintain the proper pressure in the housing 43 to prevent any of the liquid resin from oozing outwardly through the seal 52. The forward seals are regulated with pressure in order to obtain the proper resin deposition on the exterior surface of the tube. If the seal 53 was inflated with only a slight amount of pressure, then a fairly thick resin coating would exist on the surface of the tube. In like manner, if the seal 53 was inflated to a fairly high pressure, it would engage the side wall of the tube passing through the housing 43 with a fair amount of pressure and prevent a resin rich coating from existing on the surface of the tube as it passed through the housing 43. Furthermore, by inflating the seal 53 to a fairly substantial pressure, the seal will serve as a type of wiper and in essence serve to remove some of the resin matrix which may exist on the exterior surface of the tube.

It should also be recognized that the seals 52, 53 could also be employed in the housing 35 of the forced resin impregnator $R_1$.

Apparatus employing resin applicators for producing reinforced tubes $A_2$ designates an apparatus for producing high performance continuously wound filament reinforced pipe and is more fully illustrated in FIG. 5. The apparatus $A_2$ is substantially similar to the apparatus $A_1$ except that the apparatus $A_2$ employs a series of resin applicators $R_1$ in place of the resin tank 8.

The apparatus $A_2$ generally comprises a base plate 60 and mounted upon one end thereof is a spool rack 61 having a series of transversely extending spindle 62 for accommodating conventional spools of filament or roving 63. An eyelet 64 is provided for each of the spools 63 and the strands of filament 65 are trained through the eyelet 64 associated with each spool. These strands which paid-out from the spools 63 serve as the longitudinal strands in the formation of the continuous tube.

Also mounted on the base plate 60 is an upstanding A frame 66 and mounted on the upper end of the A frame 66 is a trunnion 67. Rigidly secured to the trunnion and extending forwardly thereof in a cantilever position is a mandrel 68 which is substantially similar to the mandrel 14. Mounted just forwardly of the A frame 66 on the base plate 60 is an upstanding support frame 69 for supporting the resin applicator $R_1$. By reference to FIG. 5, it can be seen that many of the longitudinal strands which are paid-out from the spools 63 are trained about the mandrel 68 and are passed through the resin applicator $R_1$.

Also mounted on the base plate 60 are a pair of helical winding stations $W_1$, $W_2$ which are substantially identical to the winding stations $W_1$, $W_2$ in the apparatus $A_1$. By reference to FIG. 5, it can be seen that each of the winding stations $W_1$, $W_2$ includes upstanding spool support frames 70 for housing circular spool support plates 71. Rotatably mounted on each of the spool support plates 71 and extending outwardly from both of the planar surfaces thereof are conventional spools of roving 72. The remainder of the structure of each of these winding stations $W_1$, $W_2$ is again identical to those previously described in connection with the apparatus $A_1$. It should be recognized that the terminal ends of the roving are threaded through eyelets or so-called "redirects" to a final placement, the eyelets being mounted on any conventional supporting structure.

It can be seen that the application of the longitudinal strands and the two helical winding stations $W_1$, $W_2$ form the triad of winding elements as previously described. The longitudinal strands are disposed about the mandrel 68 so that they substantially circumferentially envelop the mandrel 68. Furthermore, it can be seen that these strands 65 which pass through the resin applicator $R_1$ are saturated with the resin matrix contained in the housing 35. Thereafter, at the winding stations $W_1$, $W_2$, the additional helical strands are wound upon the longitudinal strands. These helical strands will tend to absorb a large quantity of the resin rich layer on the exterior surface of the longitudinal strands. At this juncture, it is possible to add an additional resin applicator $R_1$ mounted on an upstanding support 73 which is located forwardly of the winding station $W_2$. Thereafter, if the type of pipe being formed does not call for the additional layers of either longitudinal strands or helical strands, a pair of circumferential winding stations similar to the winding stations $W_3$, $W_4$ may be provided for adding this final circumferential winding to the continuously formed tube. However, it should also be recognized that an additional number of triad winding elements can be provided. For example, after the resin applicator $R_1$, it is possible to add additional longitudinal windings followed by helical winding stations similar to the stations $W_1$, $W_2$. Furthermore, it should be recognized that the resin applicators $R_2$ could be substituted for any or all of the resin applicators $R_1$. Generally, it is only necessary to use a contact resin impregnator $R_2$ at the beginning of the filament application. However, if a number of triad winding stations are employed, it is probably desirable to employ the forced resin impregnator $R_1$ in order to insure a complete contact of all of the filament strands with the resin matrix.

The remainder of the apparatus $A_2$ is substantially identical to the remainder of the apparatus $A_1$. Furthermore, the operation of these devices in all other respects is identical.

Apparatus employing an extruder for producing reinforced tube

Figure 7:
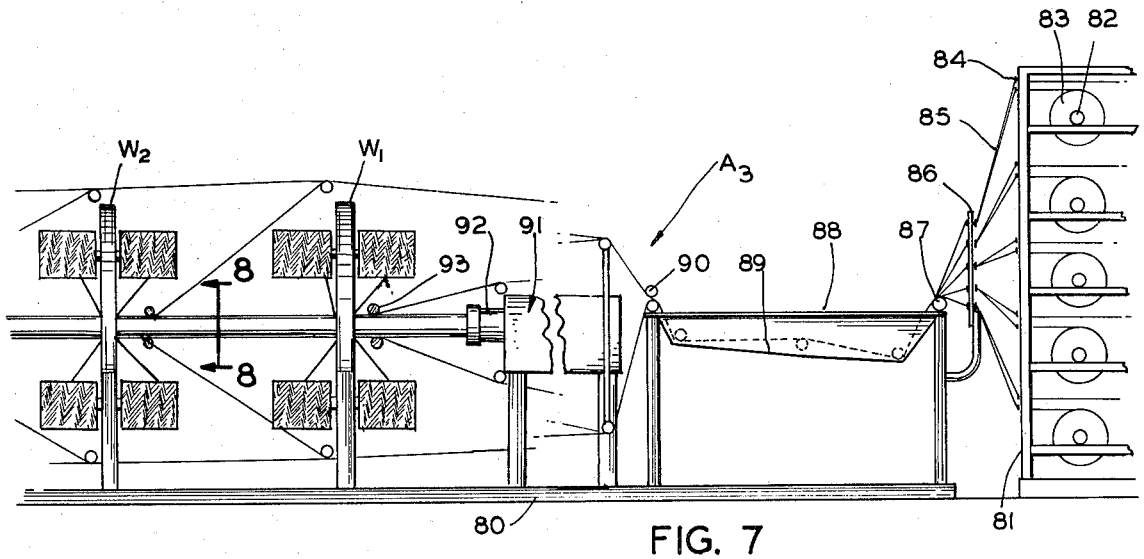
FIG. 7 is a schematic side elevational view of another modified form of tube producing apparatus which employs an extruder producing tubing which in turn forms an in-situ mandrel.
Figure 8:
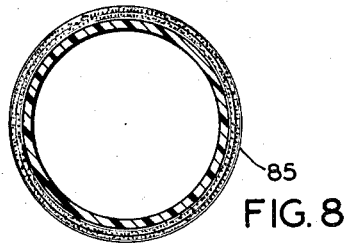
FIG. 8 is a vertical fragmentary sectional view taken along line 8—8 of FIG. 7.

It is possible to provide a modified form of tube producing apparatus $A_3$ substantially as illustrated in FIGS. 7 and 8 and which is similar to the previously described apparatus $A_1$. The apparatus $A_3$ is similar to the apparatus $A_1$, except that the apparatus $A_3$ employs an extruder for the production of a substantially rigid tubular member and therefore eliminates the necessity of a trunnion supported fixed mandrel.

Referring now to FIG. 7, it can be seen that the apparatus $A_3$ generally comprises a base plate 80 and mounted upon one end thereof is a spool rack 81 having a series of transverse extending spindles 82 for accommodating conventional spools of roving 83. A separate eyelet 84 is provided for each of the spools 83 and strands of filament 85 are trained through the eyelets 84 associated with each of the spools. The roving 85 which is employed can be any of the continuous filaments described in connection with the apparatus $A_1$ or $A_2$. The various strands 85 are drawn through a carding plate 86 being suitably apertured to properly locate each of the strands 85. The strands 85 are thereafter passed over a roller 87 which is mounted on a resin tank 88, the latter being secured to the base plate 80 in the manner as illustrated in FIG. 7. The various strands 85 are transversely spaced across the roller 87 and are passed into a trough 89 which contains a suitable liquid resin. The resin contained in the trough 89 can be any of those liquid resins which were employed in connection with the apparatus $A_1$ or $A_2$. The strands are trained through a pair of squeeze rollers 90 located at the opposite end of the trough 89. The remainder of the resin tank 88 is substantially identical to the previously described tank 8 in connection with the apparatus $A_1$.

Also mounted on the base plate 80 is a conventional extruder 91 which is designed to extrude plastic tubing having the desired cross sectional shape. In the case of making fluid transporting pipe, the extruder is provided wtih a head 92 designed to extrude plastic pipe having circular cross sectional shape. In the event that an extruder of substantially long length is employed, it is also possible to locate the extruder rearwardly of the resin tank 88. In this type of construction, the resin tank 88 could be offset slightly from the position of the extruder and the various strands 85 trained over redirect rollers (not shown) as desired. Any suitable plastic material may be employed. Such materials which can be used in the present invention are polyvinylchloride, styrene, styrene-butadiene copolymers, etc. It must be recognized that these extruded pipes should have sufficient heat resistance to pass safely through the curing zone where the pipe's structural wall is fused or polymerized. In relatively high curing temperatures, various materials can be extruded such as fluoric films, i.e. tetrafluoroethylene, polyphenylene oxide, many of the modified polycarbonates, etc.

It should be recognized that this extruded pipe which serves as the formation of an in-situ mandrel completely eliminates the necessity of having a trunnion supported fixed mandrel. While the apparatus $A_3$ does not employ a fixed mandrel supported by a trunnion, it should nevertheless be recognized that a fixed mandrel (which does not travel with the tubular member being formed) is employed. This fixed mandrel is actually existing in the extruder die and truly serves as a fixed mandrel. The extruded unit also serves as a thermoplastic seamless liner. It should also be recognized that if the operating speed of the winding components hereinafter described and of the extruding unit should vary widely enough to obviate an in-line operation, thermoplastic extruded tubing from the extruder 91 could be fed into the filament winding portion of the machine in discrete lengths. In this case, the discrete lengths of the extruded pipes would have their ends placed in juxtaposition to provide the continuous in-situ mandrel. In the interest of reducing the overall length of the apparatus $A_3$, a conventional right angle extruder could be employed.

The remainder of the apparatus $A_3$ can be substantially similar to either the apparatus $A_1$ or the apparatus $A_2$. Mounted on the base plate 80 and located forwardly of the extruder 91 are a pair of helical winding stations $W_1$, $W_2$ which are substantially identical to the previously described winding stations $W_1$, $W_2$ employed in the apparatus $A_1$. It can be seen that as the plastic pipe is extruded from the extruder 91, the longitudinal strands 85 are trained through a carding plate 93 and disposed about the liner so that they substantially circumferentially envelop the liner. Thereafter, the liner with the longitudinal strands disposed thereon is passed through the two winding stations $W_1$, $W_2$ where the reversely located helical strands are wound about the liner. At this juncture, it is possible to provide a pair of circumferential winding stations $W_3$, $W_4$ which are substantially similar to the winding stations $W_3$, $W_4$ in the apparatus $A_1$. In the event that it is desirable to provide a further triad of winding stations, i.e. the longitudinal strands and the two helical winding stations $W_1$, $W_2$, it is desirable to employ force resin applicators $R_1$ or the contact resin applicator $R_2$. In any event, the longitudinal strands 85 will probably be sufficiently saturated with a liquid matrix so that subsequently applied windings will also absorb sufficient liquid matrix. In like manner, a curing zone is also employed. The remainder of the apparatus $A_3$ is thereafter substantially identical to the apparatus $A_1$ or the apparatus $A_2$.

The use of this relatively thick film of plastic serving as a liner is particularly useful in the production of heavy-walled pipe. In the manufacture of heavy-walled pipe a number of successive winding stations and/or resin applicators may cause the apparatus to be of considerable length. If a trunnion supported fixed mandrel were employed, this mandrel would remain a structural support for each and all of these sequently applied layers and of course the mandrel would be of considerable length. This might also result in high friction loads as the uncured product is drawn along and from the mandrel. In order to relieve these high friction loads and the concomitant horsepower necessary to pull the tube along a full-length mandrel, the employment of the extruded structural liner has been found to be a very helpful expedient.

Apparatus for producing reinforced tube with a sealed liner

It is also possible to provide an apparatus $A_4$ for producing filament reinforced pipe with an interior liner, substantially as illustrated in FIGS. 9-11. The apparatus $A_4$ which is similar to the apparatus $A_1$ generally comprises a base plate 95. Mounted upon one end of the base plate 95 is a spool rack 96 having a series of transversely extending spindles 97 for accommodating conventional spools of roving 98. A separate eyelet 99 is provided for each of the spools 98 and the strands of filament 100 from each of the spools 98 are trained through the eyelets 99 associated with each spool. The various strands 100 are passed into a resin tank 101 which is substantially identical to the resin tank 8. By reference to FIG. 9, it can be seen that the resin tank 101 is also mounted on the base plate 95 forwardly of the spool rack 96. Furthermore, the resin tank 101 includes all of the rollers which are included with the resin tank 8. The strands of filaments which are used in any of the apparatus $A_1$–$A_3$ can be used in the apparatus $A_4$. In like manner, any of the resin matrices which are used in the apparatus $A_1$–$A_3$, can also be used herein.

Mounted forwardly of the resin tank 101 on the base plate 95 is an upstanding A-frame 102 and mounted on the upper end of the A-frame 102 is a trunnion 103 for supporting a forwardly extending mandrel 104 in a cantilever position. The mandrel 104 may have the desired cross-sectional shape and is substantially identical to the mandrel 14 in the apparatus $A_1$.

Also mounted on the base plate 95 forwardly of the A-frame 102 are helical winding stations $W_1$, $W_2$ which are substantially identical to the helical winding stations $W_1$, $W_2$ on the apparatus $A_1$. It is also possible to employ additional winding stations such as the circumferential winding stations $W_3$, $W_4$ in the apparatus $A_1$. Any combination of these winding stations may be employed in order to obtain the desired wall structure and the desired wall thickness. In the event that more than one triad of a pair of helical winding stations and longitudinal strands are applied, it may be desirable to use the resin impregnators $R_1$ or $R_2$.

Suitably mounted on the base plate 95 by means of any conventional supporting structure is a wrapping tube 106 or so-called "forming chute" (often referred to as a "forming shoe"), which is more fully illustrated in FIGS. 9 and 10. The wrapping tube 106 is curved about its longitudinal axis and is initially formed from a flat metal sheet. The radius of curvature decreases progressively along the longitudinal axis of the tube 106 to form an exit aperture 107. It can be seen that the right-hand end of the tube, reference being made to FIG. 9, is only slightly curved and in essence, forms a receiving tray 108 which is also curved downwardly. As the distance along the tube 106 progresses to the left-hand end thereof, the longitudinal margins are curved upwardly and inwardly so that the tube would form a surface of revolution, the circumference and radius of which would decrease with progression along the longitudinal axis thereof. The two longitudinal margins of the tube 106 are curved upwardly until they are only separated by a small distance and are then struck upwardly in the form of a pair of spaced opposed upwardly extending flanges 109, separated by a longitudinal slot 110. It can be seen that at the point where the tube is formed with the upwardly extending flanges 109, the diameter of the tube is slightly larger than the diameter of the mandrel 104. The tube 106 may also be constructed by forming the same from sheet metal or it can be made of plastic in any conventional forming operation. A pair of pinch rollers or so-called "hemming rollers" (not shown) are also provided and are angularly located for tightly enveloping a plastic sheet (hereinafter described) about the mandrel 104.

The upper half of the left-hand end of the tube is cut away for the accommodation of a pair of metallic plates 112 forming part of a yoke 113, which is in turn operatively associated with a sonic sealing device 114. The sonic device 114 is conventional in its construction and is, therefore, neither further illustrated nor described in detail herein. However, the plates 112 have the same size and shape as the portion of the tube 106 which was removed and are provided with arcute walls which terminate in similar upstanding flanges. It should also be recognized that sealing devices such as a heat sealing unit or bonding iron may be employed to seal the longitudinal margin of a plastic film.

Also conventionally mounted on the A-frame 102 is a spindle 115 for rotatably supporting a spool of plastic film or sheet 116. The film 116 is passed through the tube 106 from the right-hand end thereof in the manner as illustrated in FIGS. 9 and 10. Thereafter, the film 116 is caused to be wrapped about the mandrel 104 as it passes through the tube 106. It can be seen that as the plastic sheet is pulled through the tube 106, the longitudinal margins of the film will curve in conformance with the cross-sectional shape of the tube 106. Furthermore, the longitudinal margins of the plastic sheet will extend into the longitudinal slot 110 between the pair of upstanding flanges 109. Actuation of the sealing unit will seal the upper longitudinal margins of the plastic sheet around the mandrel 104, thereby forming a plastic liner around the mandrel. Alternately, the longitudinal margins could be placed in overlapping relationship and sealed in such fashion.

Some of the plastic films which are capable of being used in connection with this embodiment of the invention are some of the vinyl copolymers such as vinylidene fluoride. The films which may be employed in this connection are the various plastic materials, such as polyphenylene oxide, polysulfones and some of the modified polycarbonates, chlorinated polyethers, and some of the fluorics such as polyvinylidene fluoride. These latter materials must naturally have sufficient heat resistance to pass safely through the curing zone where the pipe structural wall is fused or polymerized. For the relatively high curing temperatures such as 350° F. and higher, the various fluoric films such as tetrafluoroethylene and the polyphenylene oxides, the polysulfones, etc., are very effective.

It has been found that the liner material can be selected so that it is very effective to withstand the effect of corrosive fluids or abrasives which are intended for use in the finally formed pipe. In addition, these liners also serve as a type of heat insulating shield. The liner which is wrapped about the mandrel is then passed through the various winding stations such as the stations $W_1$, $W_2$. The longitudinal strands are trained through a carding plate 117 and applied to the liner so that they circumferentially envelop the liner prior to the introduction of the liner into the first winding station $W_1$. This structure is more fully illustrated in FIG. 9. It can thus be seen that the finally formed tube is substantially identical to the tube formed on the apparatus $A_1$ except that a liner has been formed on the inner surface of the tube. The remaining portion of the operation is substantially identical to that described in connection with the apparatus $A_1$.

Apparatus for producing reinforced tube by forming an in-situ mandrel on a fixed mandrel It is possible to provide an apparatus $A_5$ for producing filament reinforced pipe which is similar to the apparatus $A_1$ except that an in-situ mandrel is formed about the fixed mandrel and subsequent winding is performed on the in-situ mandrel. The apparatus $A_5$ which is more fully illustrated in FIGS. 12 and 13 generally comprises a base plate 120. The apparatus $A_5$ includes a spool rack (not shown) similar to the spool rack 2 employed in the apparatus $A_1$. This rack will naturally have the means for accommodating the conventional spools of roving in order to pay-out strands of filament 121 from each of the spools. The various strands 121 are passed into a resin tank 122 which is mounted on the base plate 120 in the manner as illustrated in FIG. 12. The resin tank 122 is again substantially identical to the resin tank 8 employed in the apparatus $A_1$. Furthermore, the tank 122 is provided with the same type of roller structure which was employed in the tank 8.

Also mounted on the base plate 120 in forwardly spaced relation to the resin tank 122 is an upstanding A-frame 123. Mounted on the upper end of the A-frame 123 is a trunnion 124 for supporting a forwardly extending mandrel 125 in a cantilever position.

Also mounted on the base plate 120 in forwardly spaced relation to the A-frame 123 is a wrapping tube or forming shoe 126 which is substantially similar to the previously described forming shoe 106 in the apparatus $A_4$. The wrapping tube 126 is also curved about its longitudinal axis to form a right-hand end receiving tray 127 and a left-hand end exit aperture 128. Furthermore, as the distance of the tube 126 progresses to the left-hand end thereof, reference being made to FIG. 12, longitudinal margins are curved upwardly and inwardly so that the tube forms a surface of revolution, the circumference and radius of which decreases with progression along the longitudinal axis thereof. The two longitudinal margins of the tube are curved upwardly in the form of a pair of upwardly struck flanges 129 which are separated by a longitudinal slot. Furthermore, a portion of the upwardly extending flanges are cut away at the left-hand end thereof in order to accommodate a pair of metallic plates 130 forming part of a yoke 131. The yoke 131 is in turn operatively connected to a sonic sealing device or other conventional sealing mechanism (not shown). This device, however, is conventional in its construction and is therefore neither illustrated nor described in detail herein. A pair of pinch rollers (not shown) are also provided. The remaining structure of the forming tube 126 and the sealing device is substantially identical to that employed in the apparatus $A_4$.

Also mounted on the A-frame 123 is a spindle 132 for rotatably supporting a spool of plastic film or sheet 133. The sheet 133 is passed into the wrapping tube 126 in the manner as illustrated in FIG. 12. It can be seen that as the sheet passes through the tube 126, the longitudinal margins of the sheet 133 will curve in conformance with the cross section shape of the tube 126. Furthermore, the longitudinal margins of the plastic sheet will extend into the longitudinal slots existing between the flanges 129. Actuation of the sonic sealing unit and the plates 130 will seal the upper longitudinal margins of the plastic sheet thereby substantially enveloping the sheet around the mandrel 125.

Also mounted on the base plate 120 in forwardly spaced relation to the wrapping tube 126 is an upstanding support frame 134 which retains a curing unit 135 at its upper end. By reference to FIG. 12, it can be seen that the curing unit is suitably apertured to accommodate both the mandrel 125 and the plastic sheet 133 wrapped therearound. The film 133 is preferably a film or material of the type which can be polymerized or set in a rigid state in the curing unit 135. Furthermore, the unit 135 is designed to be compatible with the type of plastic sheet 133 that is employed. The film 133 may be a reinforced plastic mat with chopped glass and could be impregnated with resin so that the latter is in the A or B stage. However, when introduced into the curing unit 135, the resin may be progressed to its fully cured or C stage. Some of the other materials which may be employed as the plastic 133 are mats of "C glass," long-staple asbestos, synthetic fibers of nylon, polyester, etc. The binder resin which may be included in this material could be among those resins selected for use in the resin applicators and resin tanks heretofore described. However, it is also possible to use in this particular application such resins as bisphenol A/fumarate, bisphenol A/acrylate, etc.

Also mounted on the base plate 120 in forwardly spaced relation to the curing unit 135 are a pair of winding stations $W_1$, $W_2$ which are substantially identical to the winding stations $W_1$, $W_2$ used on any of the previous apparatus $A_1$–$A_4$. Again, these winding stations $W_1$, $W_2$ may be helical winding stations or spiral winding stations as desired. In addition, it can be seen that the longitudinal strands 121 are passed through a carding plate 136 and introduced at points prior to each of the winding stations $W_1$, $W_2$. Accordingly, the first triad of longitudinal strands, helical strands and a second layer of helical strands in reverse direction has been illustrated and described in connection with the apparatus $A_4$. It should be recognized that additional triads of winding stations may be employed. In addition, it should be recognized that any number of circumferential winding stations may also be employed as desired in order to attain the desired wall structure and desired wall thickness. It can be seen, however, in connection with this apparatus $A_5$, that only a relatively short mandrel 125 is employed. Prior to the first triad of winding stations, the film 133 is hardened to form an in-situ mandrel about which further winding is performed. Not only does the film 133 serve as an in-situ mandrel, it also serves as a liner in the finally formed tubular product.

It should be recognized that any of the resin applicators $R_1$ or $R_2$ may also be employed in place of the resin tank 122 or in addition to the resin tank 122 if a number of triad winding stations are to be employed. As the length of the entire apparatus $A_5$ is increased, it may be desirable to reimpregnate some of the fibrous strands prior to a final curing unit. In like manner, the apparatus $A_5$ also includes a curing unit similar to the unit 24. Furthermore, the device also includes a pulling unit similar to the unit 31. In essence, the remaining portion of the structure of the apparatus $A_5$ is substantially identical to that described in connection with the apparatus $A_1$. Furthermore, the process of using each of these apparatus is thereafter the same.

Apparatus for producing reinforced tube with an interior liner

FIGS. 14 and 15 disclose another embodiment of the apparatus and method of the present invention for forming tubular products with an interior liner. The apparatus $A_6$ illustrated in FIG. 14 is substantially similar to the apparatus $A_1$ and the apparatus $A_5$ except that the longitudinal margins of the film are not sealed and the film is not polymerized or hardened. The apparatus $A_6$ generally comprises a base plate 140. The apparatus $A_6$ also includes a spool rack (not shown) similar to the spool rack 2 in the apparatus $A_1$ and would normally include the spools of roving on the spool rack. Individual strands 141 from each of these spool racks are trained through a resin tank 142 which is substantially identical to the previously described resin tank 8 in the apparatus $A_1$. Furthermore, the resin tank 142 would normally include all of the various rollers which are included in the resin tank 8. Moreover, the various types of filament roving which can be used in the apparatus $A_1$ and the various liquid matrix which can be employed in the tank 8 can also be used in the apparatus $A_6$.

Also mounted on the base plate 140 in forwardly spaced relation to the tank 142 is an A-frame 143. Mounted on the upward end of the A-frame 143 is a trunnion 144 for supporting a forwardly extending mandrel 145 in the manner as illustrated in FIG. 14. The mandrel 145 can be of circular or noncircular cross sectional shape as desired.

Also mounted on the base plate 140 by means of any suitable supporting structure is a wrapping tube 146 which also extends around the mandrel 145 and is similar to the wrapping tube 126. In essence, the wrapping tube 146 is the same as the wrapping tube 126 except that it does not include the sonic mechanism or other sealing device for sealing the longitudinal margins of a plastic sheet. Also mounted on the A-frame 143 is a spindle 147 for suitably supporting a roll of plastic film or sheet 148. Again, the plastic sheet 148 which is employed in the apparatus $A_6$ would be identical to the plastic sheet 116 which is employed in the apparatus $A_4$. In many cases, it is not necessary to seal the longitudinal margins of the plastic sheet as was done in the case of the plastic sheet 116 in the apparatus $A_4$. This type of apparatus $A_4$ leaves a slight seam along one portion of the side wall of the liner.

In the apparatus $A_6$, the tube 146 is curved in such manner that one longitudinal margin of the plastic sheet 148 is folded over the opposite longitudinal margin thereof in an overlapping manner. Furthermore, it is considered to be within the realm of the present invention to employ a conventional glue applicator for adhesively securing the overlaying margin of the plastic sheet to the margin of the plastic sheet lying therebeneath in immediate marginal registration.

Also mounted on the base plate 140 are a pair of helical winding stations $W_1$, $W_2$ which are substantially identical to the helical winding stations $W_1$, $W_2$ in the apparatus $A_1$. Furthermore, it can be seen that the longitudinal strands 141 are trained through suitable eyelets 149 and suitable redirects 150 in order to properly locate the strands 141 on the liner thus formed. Prior to the time the liner passes through the first winding station $W_1$, a series of longitudinal strands 141 are applied to the liner so that the longitudinal strands 141 substantially circumferentially envelop the liner. Thereafter, as the liners with the longitudinal strands thereon pass through the first winding station $W_1$, a first layer of helical strands is applied thereo. Following this, a second layer of helical strands in the reverse direction is also applied to the liner and the thus formed windings. Furthermore, as indicated in FIG. 14, it is possible to add an additional layer of longitudinal strands prior to the second winding station $W_2$.

It can thus be seen that the triad of windings is again provided. As in the case of any of the previously described embodiments of this invention, it is possible to employ additional triads of winding stations or any spiral winding stations or circular winding stations as desired. Again, the the type of winding stations employed and the number of stations employed is determined by the desired wall structure and wall thickness of the finally formed tube.

Apparatus for producing reinforced tube by formation of a filament wound in-situ mandrel It is possible to provide a modified form of filament winding apparatus $A_7$ which is more fully illustrated in FIG. 16 and which is similar to the apparatus $A_1$. The apparatus $A_7$ differs from the apparatus $A_1$ in that a relatively short mandrel is employed and this mandrel is only used to form a filament wound pipe which is ultimately cured for purposes of serving thereafter as an in-situ mandrel.

The apparatus $A_7$ generally comprises a base plate 155 and mounted upon one end thereof is a spool rack 156 having a series of transversely extending spindles 157 for accommodating conventional spools of roving 158. A separate eyelet 159 is provided for each of the spools 158 and the strands of filament 160 are trained through the eyelet 159 associated with each spool. The roving which can be employed in the case of the apparatus $A_7$ is the same as the roving which was employed in any of the previously described apparatus herein.

Each of the strands of filament 160 is directed through a carding plate 161 and into a resin tank 162 which is mounted on the base plate 155 in the manner as illustrated in FIG. 16. The resin tank 162 is again substantially identical to the previously described resin tank 8 and includes all of the rollers which were associated with the resin tank 8. Furthermore, the liquid matrix which can be employed is the same as any of the liquid matrix which was employed in any of the previously described apparatus herein.

Rigidly mounted on the base plate 155 and being longitudinally spaced from the resin tank 162 is an A-frame 163. Mounted on the A-frame 163 is a trunnion 164 for supporting a forwardly extending mandrel 165 in a cantilever position. The mandrel 165 is similar to the mandrel 14 in the apparatus $A_1$ and can be either of a circular or a noncircular cross section. Also mounted on the base plate 155 is a carding plate 166 which is provided with spaced apertures for directing the longitudinal strands 160 onto the mandrel 165. In essence, the apertures are so located so that the strands 160 are deposited on the mandrel 165 in such manner that they substantially circumferentially envelop the mandrel 165.

Also mounted on the base plate 155 in forwardly spaced relation to the A-frame 163 are a pair of helical winding stations $W_1$, $W_2$ which are substantially identical to the previously described winding stations $W_1$, $W_2$ in the apparatus $A_1$. The first winding station $W_1$ is designed to apply a first layer of helical winding to the longitudinal strands and the second winding station $W_2$ is designed to apply a second layer of helical winding opposite to the direction of the windings at the station $W_1$.

By further reference to FIG. 16, it can be seen that the mandrel 165 extends into a suitable curing device 167 which is substantially identical to the curing device 24 in the apparatus $A_1$. The curing device 167 is suitably mounted on a frame 168 which is in turn secured to the base plate 155. The curing unit 167 is preferably an "R-F" heating unit and operates in the same manner as the curing unit 24.

It can thus be seen that the triad of winding stations which includes the application of the longitudinal strands and the application of the two types of helical strands at the stations $W_1$, $W_2$, forms a sufficient wall thickness. Furthermore, these strands have received sufficient resin from the longitudinal strands 160 which pass through the resin tank 162. As this combination of rovings passes through the curing unit 167, it is hardened and forms a substantially rigid tube. Thereafter, this tube serves as an in-situ mandrel. It can be seen that the mandrel 165 terminates at the curing unit 167.

It is now possible to provide a series of additional triads of winding stations as may be desired. The station $W_3$ as illustrated in FIG. 16 illustrates the first helical winding station of a second triad. It can also be seen that longitudinal linings are applied to the thus formed pipe just prior to the winding station $W_3$. Thus, these helical strands are applied to the pipe so that they substantially envelop the pipe. Thereafter, at the first winding station of this new triad $W_3$, new helical windings will be applied.

It should be observed that any type of winding station and any combination of these stations may be employed after the formation of the initial pipe. The type of winding stations and their respective locations is of course determined by the desired wall structure of the finally formed tube and the desired thickness. This type of formation of an in-situ mandrel has been found to be most effective where a number of triads or winding stations has been found to be necessary in order to build up a relatively thick pipe wall.

The remainder of the apparatus $A_7$ is substantially identical to the apparatus $A_1$ and would normally include a pulling unit, etc. Furthermore, the method of operation of the remainder of the apparatus $A_7$ is substantially identical to that of the apparatus $A_1$.

Apparatus for laying tube from a moving vehicle

Any of apparatus $A_1$-$A_7$ has been found to be particularly effective in continuously laying pipe from a moving vehicle. For example, these apparatus can be used in continuously forming and subaqueously depositing pipe from a boat, or continuously forming and terraneously or subterraneously depositing pipe from a truck or the like. For subaqueous pipe deposition, an apparatus $A_8$ substantially identical to any of the apparatus $A_1$-$A_7$ can be conventionally mounted in a boat B of the type illustrated in FIG. 17, which is partially broken away. The boat B is generally provided with a relatively deep hold 170 for accommodating the apparatus $A_8$ in the manner as illustrated in FIG. 17. The ship is provided on its bow end with a trap door 171 for permitting the withdrawal of pipe from the boat B. At its stern end, the ship is provided with a conventional helm 172 much in the same manner as the type of ship presently being used for laying undersea cables. It is to be noted that the ship B is stern-advancing so that the pipe is continually withdrawn from and laid from the bow of the ship.

It has been found in connection with the present invention that it is possible to produce and lay pipe from the boat B at a rate of approximately 4 to 7 feet per minute, depending upon the pipe diameter and the wall thickness desired. The hold of the boat B is preferably covered with a cover 173 to prevent salt spray from interfering with the operating conditions of the apparatus $A_8$. Furthermore, in many cases, it may be desirable to employ conventional dehumidifiers in the hold of the boat B in order to attain the proper operating conditions.

The apparatus $A_8$ like the apparatus $A_1$ generally includes a creel or spool rack 174 having conventional spools of roving for paying out individual strands of roving 175. These strands are passed through a resin tank 176 similar to the resin tank 8. As illustrated in FIG. 17, it can be seen that four winding stations $W_1$, $W_2$, $W_3$, and $W_4$ are employed. These winding stations are substantially identical to the winding stations $W_1$-$W_4$ respectively, in the apparatus $A_1$. Furthermore, a curing unit 177 similar to the curing unit 24 is employed. Thereafter, a pulling unit 178 similar to the pulling unit 31 is also employed. However, it can be seen that in connection with the apparatus $A_8$, it is necessary to employ a braking unit 179. The braking unit is also secured to the hold of the boat B in alignment with the remaining components of the apparatus $A_8$. The braking unit can be of any conventional construction and is desirable inasmuch as it insures that pipe will not be pulled from the mandrel due to the forward motion of the boat B or hanging weight of the finished pipe at too high a rate of speed.

The boat B is preferably provided with a conventional centering device 180 such as the type normally found in ships employed in cable laying operations. These centering devices generally include three or more rollers located 120° apart and are shiftably mounted on a frame. The pipe or tubing which is formed in the boat B will be trained through each of these rollers at the point of discharge from the boat B. Furthermore, this structure is movable in order to overcome any unauthorized jarring or shifting of the boat B.

Filament reinforced pipe lines which are subaqueously placed have several distinct advantages which are inherent with their materials of construction. Pipe lines of this type are corrosion resistant and are light in weight. Furthermore, inasmuch as the apparatus $A_8$ is capable of producing pipe on a continuous basis, the usual jointing of pipes has been eliminated. Furthermore, the pipe has a light negative buoyancy factor in terms of minimal resting load when filled with liquid and disposed upon the bed of a body of water. Filament reinforced pipe produced by the apparatus $A_8$ also has a greater flexibility than the conventional steel and metal pipe, and this results from the relatively low modulus of elasticity of filament reinforced pipe. Generally, the modulus of elasticity is approximately $1.5 \times 10^6$ to approximately $2.4 \times 10^6$. As a result of this low modulus of elasticity, the filament reinforced pipe of the present invention will sustain almost continuous cyclic bending reverses within about 8 to 12 degrees amplitude without fatigue.

In the manufacture of high performance underwater pipe, it is desirable to employ at least four winding stations as illustrated in FIG. 17. After interspersed layers of longitudinal filaments and a pair of opposed helical windings have been deposited on the mandrel, a final outer-surface pair of opposed circumferential windings are then deposited on the thus built-up laminate.

A second longitudinal wrap is applied between the pair of opposed helical wraps and a third longitudinal wrap is applied between the pair of opposed circumferential wraps. Accordingly, the finally produced pipe will have a first layer of longitudinal strands, a second and third layer of opposed helical windings, a fourth layer of longitudinal strands and a fifth and sixth or more layers of opposed helical windings. In addition, the pipe may have additional layers of longitudinal strands and additional layers of outermost circumferential windings. It has been found that this type of pipe provides superior results when used in subaqueous operations.

Apparatus for producing structural shapes

The apparatus of the present invention readily lends itself to the manufacture of tubular sections having noncircular cross sections. For example, it is possible to employ mandrels having rectangular or trapezoidal shapes in cross section, thereby producing tubular sections having a shape substantially similar to that of the mandrel. The uniqueness and versatility of the apparatus described herein enables economical and efficient production, for example, of filament-reinforced ladder rails on a continuous basis.

Today the majority of ladders are constructed either of wood or lightweight metals such as aluminum. Wood is rapidly losing much of its attractiveness and is becoming an undesirable material of construction for ladders inasmuch as wood has a tendency to deteriorate rapidly when subjected to the weathering elements, even when wood is precoated with a weather protective coating. In addition, after wood has begun to age for any period of time, the user of the equipment may be subjected to possible injuries through splinters. Aluminum and other similar materials of construction are disadvantageous because of their electrical conductivity properties. Generally, most utility companies require fiberglass or wooden ladders or scaffolds. This is particularly true in the case of electrical and telephone utility companies where personnel using the ladder have a tendency to come into contact with high voltage sources.

This has led to the rise of fiberglass reinforced ladders. However, there is at present no economically feasible process for producing the elements forming part of the ladders with fiberglass as the material of construction. As a result thereof, the ladders presently constructed of fiberglass are rather expensive and their use is limited to various utility companies where the personnel may come into contact with electrical power sources.

An apparatus $A_9$ for producing structural shapes on a continuous basis is more fully illustrated in FIG. 18. The apparatus $A_9$ generally comprises a base plate 190 and mounted upon one end thereof is a creel or spool rack 191 having a series of transversely extending spindles 192 for accommodating conventional spools of roving 193. A separate eyelet 194 is provided for each of the spools 193 and strands of filament 195 from each of the spools 193 are trained through the eyelets 194 associated with each of the spools. A resin tank 196 is also mounted on the base plate 190 and is substantially similar to the resin tank 8 in the apparatus $A_1$. Furthermore, the resin tank 196 includes all of the roller structure which is present in the resin tank 8. The same filament and resins which are useful in the apparatus $A_1$ are also useful in the apparatus $A_9$.

Also mounted on the base plate 190 forwardly of the resin tank 196 is an upstanding A-frame 197. Mounted on the upper end of the A-frame 197 is a trunnion 198 for supporting a forwardly extending mandrel 199 in a cantilever position. The mandrel 199 can be secured to the trunnion 198 in any conventional fashion. Furthermore, the mandrel can have any desired cross sectional shape. In the production of structural elements, the mandrel generally has a noncircular cross sectional shape. For ladder rails, the mandrel generally has a rectangular shape of the type illustrated in FIG. 19.

Also mounted on the base plate 190 in forwardly spaced relation to the A-frame 197 are a pair of circumferential winding stations $W_3$, $W_4$ which are substantially identical to the winding stations $W_3$, $W_4$ employed in the apparatus $A_1$. It is to be noted that the mandrel 199 extends through each of these winding stations $W_3$, $W_4$. The mandrel 199 also serves as the inner-surface-defining element for the continuous tube which is produced thereon. In addition, the mandrel may be coated with the tetrafloroethylene polymers (Teflon) in order to reduce friction during the pulling of the continuous tube thereon.

Also mounted on the A-frame 197 is a carding plate 200 for directing the longitudinal strands 195 onto the mandrel 199 at the point of application of the circular strands at the first winding station $W_3$. It can be seen that the triad of winding stations employed in this type of apparatus includes the longitudinal strand followed by the first set of circumferential strands at the station $W_3$ and the second set of circumferential strands at the station $W_4$. The circumferential strands at the station W4 are applied in a direction which is reverse to that at the station $W_3$. It should be recognized that this type of winding combination is preferable in the manufacture of ladder rails. However, for manufacturing other structural elements having noncircular cross sectional shapes, it may be desirable to employ helical windings in place of or in addition to the circumferential windings. In addition, it may be desirable to employ any combination of these windings.

In the manufacture of the ladder rails such as illustrated in FIGS. 18–22, it is desirable to apply a series of longitudinal strands to each of the four corners of the mandrel so that in essence, these strands overhang the corners in the manner as illustrated in FIG. 19. Circumferential strands are applied at the winding station $W_3$ until a structure similar to that of FIG. 20 has been attained.

Thereafter, additional longitudinal layers are applied to both the upper and lower surfaces of the mandrel and to each of the side walls. However, a substantially larger number of strands are applied to both the upper and lower walls than to the side walls in order to attain the structure appearing in FIG. 21. Finally, circumferential strands are applied at the additional circumferential winding station $W_4$. In the manufacture of ladder rails, it is necessary to have relatively thick end walls connected by relatively thin side walls, since the end walls carry the substantially greater portion of the load. Accordingly, the end walls are built-up with a rather thick layer of longitudinal strands. If desired, it is possible to apply one or more additional layers of circumferential strands by additional winding stations (not shown).

The ladder rails are urged through a sizing unit 201 which is more fully illustrated in FIG. 22 and which is mounted on a support frame 202, the latter being secured to the base plate 190 in the manner as illustrated in FIG. 18. The sizing unit 201 generally includes four wiper shoes 203 which are secured to the interior surfaces of the four walls forming the rectangular unit 201 in the manner as illustrated in FIG. 22. The four rectangularly located wiper shoes 203 have flat interior surfaces 204 which engage the exterior surface of the tubular member being formed on the mandrel 199 and serve to smooth the surfaces of the exterior walls of the tubular member and remove any nonlinearities in the same so that the walls are substantially flat. However, it is to be noted that the corners of the tubular member are still rounded.

The ladder rails are cured in a curing unit 205 which is also mounted on the support frame 202 in the manner as illustrated in FIG. 18. The curing unit 205 is substantially identical to the curing device 24 in the apparatus $A_1$ except that the electrode through which the tube passes is noncircular as hereinafter described. Moreover, it can be seen that the mandrel extends through the curing unit 205 and terminates at the opposite end thereof. Also mounted on the support frame 202 in forwardly spaced relation to the curing unit 205 is a pulling unit 206 which is also substantially similar to the pulling unit 31 in the apparatus $A_1$. The pulling unit 206 necessarily has sufficient pulling force to overcome the friction of the tubular member formed on the mandrel 199. A conventional abrasive rimmed disc saw or so-called "circle saw" 207 is mounted on a shiftable dolly 208 which is in turn shiftably mounted on the support frame 202 in order to cut the formed tubing into desired discrete lengths. Naturally, these lengths would be suitable to constitute ladder rails. It is also possible to mount on the support frame 202 a conventional drilling mechanism 209 for selectively drilling apertures in the side walls of the ladder rail in order to insert ladder rungs (not shown). It is to be noted that the drilling mechanism 209 is also mounted on a dolly 210 which is shiftable along the support frame 202. The drilling mechanism 209 is preferably provided with an indexing probe which will engage previously drilled holes in the ladder rail for indexing the proper position to accomplish the drilling of the next adjacent set of holes. Both the saw 207 and the drilling unit 209 are conventional items and are therefore not described in further detail herein.

It should be recognized that the saw 207 and the drilling unit 209 will move for selected lengths equivalent to the rate of movement of the tubing formed. In essence, each of these components will move forwardly, that is the left-hand direction in FIG. 18 for a selected distance until the operation is completed and thereafter move back to its original right-hand position for the start of a new cycle. These components would also include positive accompanying speed adjustable sequential automatic cutoff points and conventional circuitry for limit switch actuation. It is also possible to employ a run-out table (not shown) which is capable of accommodating the longer length of discretely cut sections of tubing. This table would be moderately inclined perpendicularly to the axis of the tube to cause natural stacking and accumulation of the discrete lengths. This will also allow the entire operation to progress virtually unattended for long periods of time.

The curing unit 205 will also be a radio frequency curing unit or sonic curing unit. However, in place of the aluminum pipe section 26 in the curing unit 24, a rectangularly shaped tubular element 211 is employed and serves as one electrode while the mandrel 199 will serve as the other electrode. In addition, the element which has flat interior surfaces will smooth the surface of the tubular member as it is being cured. The electrode 211 could also serve as the wiper shoes 203 thereby eliminating the necessity of the sizing unit 201.

Also mounted on the base plate 190 is a support table 212 and mounted on the upper end thereof is a label applicator 213. The applicator 213 includes a roll of resin impregnable paper labels and a roller which continuously applies the strip of labels to the side wall of the tube being formed. The label applicator 213 also may mounted on a dolly for movement with the ladder rail for selective distances. This type of device would normally include a pair of pneumatically controlled arms (not shown) which engage a label from a stack of individual discrete labels and move the same to the side wall of the tube being formed. This dolly would shift in timed relation to the movement of the tube on the mandrel 199. By reference to FIG. 18 it can be seen that the label applicator is located between the winding stations $W_3$ and $W_4$ so that the label is applied prior to the wrapping of the final circumferential winding. In this case, the label is always protected by an outer coating of resin impregnated glass. Furthermore, the label is always clearly visible since the resin wetted filament material employed may be transparent.

In some cases, it may be desirable to employ a shrouded heating zone (not shown) where conditioned heat is maintained on the tubular member at about 200° F. This additional type of unit may be desirable in some cases to prevent some thermal shock and eliminate any latent exothermic overheating. Also, the cured tube may be allowed to traverse an open area to facilitate further cooling before entering the pulling unit 206.

The finally finished structure of the ladder rail is similar to that appearing in cross section in FIG. 21. It should be noticed that in order to acquire the relatively thick end walls or so-called "caps," positioning rings may be employed to lay the longitudinal strands upon the mandrel in the desired positions. It should be noted that the strands overhang the end walls and onto the side walls to provide relatively short margins of thickened areas on the side walls. The circumferential windings provide the largest portion of the ladder rails inner surface and as indicated above are accomplished by the winding stations $W_3$, $W_4$. Only the longitudinal fibers are resin-impregnated and the circumferential strands are applied in a dry state. Experience has shown that with resins of proper viscosity, alternate layers of resin wet and dry strands will become uniformly and completely thoroughly impregnated almost instantly. This arrangement eliminates the need for carrying additional resin baths with the winding stations or the need for providing resin impregnators.

It should also be recognized that ladder rails are only one of the structural members which can be formed on the apparatus of the present invention. Naturally, almost any type of structural member can be formed on the apparatus by adjusting the size and cross sectional shape of the mandrel and providing the desired winding stations.

Apparatus for producing reinforced tube with overhead roving stations

It is possible to provide a modified form of filament winding apparatus $A_{10}$ which is more fully illustrated in FIG. 24 and which is similar to the apparatus $A_1$. The apparatus $A_{10}$ differs from the apparatus $A_1$ in that overhead filament sources are employed, thereby eliminating the need of a floor mounted creel and a resin tank.

The apparatus $A_{10}$ generally comprises a base plate 220 and mounted on the base plate 220 is an upstanding A-frame 221 having at trunnion 222 for supporting a fixed mandrel 223 in a cantilever position. The mandrel 223 is similar to any of the previously described mandrels and may be either circular or noncircular in cross section. Located in upwardly spaced relation to the base plate 220 and any of the components (hereinafter described) which are mounted on the base plate 220 is a suspended support plate 224 having upstanding creels 225, each having a supply of roving spools 226. Roving strands 227 are pulled or unwound from each of the spools 26 and applied to the fixed mandrel 23 to form the longitudinal strands thereon in a manner to be hereinafter described in more detail.

Also mounted on the base plate 220 in forwardly spaced relation to the A-frame 221 are a pair of upstanding guide posts 228 having guide apertures 229 for receiving the roving strands 227. The strands are then threaded through a carding plate 230 for applying the strands to the mandrel 223 in a longitudinal pattern so that they substantially envelop the mandrel. The carding plate 230 can be mounted on any suitable supporting structure. It can be seen that the upstanding posts 228 and the carding plate 230 form the first longitudinal strand application station.

Also mounted on the base plate 220 in forwardly spaced relation to the thus described longitudinal application station are helical winding stations $W_1$, $W_2$ which are substantially identical to any of the previously described helical winding stations described herein. These stations normally carry spools of roving 231 and the strands from these spools 231 are trained through eyelets 232 and thereupon wound about the longitudinal strands as they pass the winding stations $W_1$, $W_2$.

Mounted on the base plate 220 in forwardly spaced relation to the winding station $W_2$, reference being made to FIG. 24, is an upstanding frame 233 for supporting a resin impregnator $R_1$ which is located to receive the mandrel and the strands wound thereupon. Thus it can be seen that the longitudinal strand application station and the winding stations $W_1$ and $W_2$ form a triad of winding stations and the strands applied at this triad of stations are impregnated immediately thereafter. It should be recognized that the resin impregnator $R_2$ could be used as well as the resin impregnator $R_1$.

Also mounted on the base plate 220 in forwardly spaced relation to the resin impregnator $R_1$ are a pair of upstanding guide posts 234 which are provided with apertures 235 and a carding plate 236 circumferentially disposed about the mandrel. The posts 234 and the carding plate 236 constitute a second longitudinal strand application station. Roving strands are received from an overhead supply station 237 including a suspended support plate 238 having upstanding creels 239 and roving spools 240. The roving strands 241 are unwound from each of the spools 240 trained from the apertures 235 through the carding plate 236 and onto the strands previously wound on the mandrel 223. Circumferential winding stations $W_3$, $W_4$, similar to the previously described winding stations $W_3$, $W_4$, are also mounted on the base plate 220 and are designed to apply circumferential strands to the longitudinal strands applied immediately prior thereto. The strands from the winding stations $W_3$, $W_4$ are trained through eyelets 242 and directed onto the longitudinal strands. It can be seen that this second longitudinal strand application station and the winding stations $W_3$, $W_4$ constitute a second triad of winding stations. A frame 243 mounted on the base plate 220 supports a resin impregnator $R_1$ which is located to receive the mandrel and the strands thereon. Any number of winding station triads could be employed and the embodiment of this invention is not necessarily limited to the two triads illustrated and described. As previously indicated, any type of winding station combination and any number thereof may be employed. Furthermore, it may be possible to eliminate all but one of the resin impregnators $R_1$ or $R_2$ by merely locating the resin impregnator after the last winding station. It should be recognized that by locating the support plate 238 with the roving spools thereon immediately above the station for the application of longitudinal strands, it is possible to materially reduce the overall length of the apparatus.

Also mounted on the base plate 220, in the manner as illustrated in FIG. 24, is a curing unit 244 which is similar to any of the previously described curing units and a puller 245 which is similar to any of the previously described pulling units. Furthermore, this apparatus operates in a manner similar to any of the previously described apparatus.

The suspended support plate 224 having upstanding guide posts 228 which possess guide apertures 229 for the reception of the roving strands 227 as well as the arrangement of the roving spools 226, the mandrel 223 and the carding plate 230, which have been used in the apparatus above, are shown in FIG. 25.

It should be understood that changes and modifications in the form, construction, arrangement and combination of parts can be made and substituted for those herein shown without departing from the nature and principle of our invention.

Having thus described our invention, what we desire to claim and secure by Letters Patent is:

1. An apparatus for producing filament reinforced tubular members, said apparatus comprising base means, a fixed rigid mandrel operatively mounted on said base means in a cantilever position, in-situ mandrel forming means for forming a tubular element on said mandrel and which element has sufficient internal strength for having filament strands applied thereto for serving as a movable in-situ mandrel, said mandrel having a smooth surface, motion means for readily shifting said tubular element and any strands applied thereto along said mandrel during the application of the strands thereto, said motion means removing said tubular element and any strands applied thereto from said mandrel and beyond the terminal end thereof, at least one strand application station located beyond the terminal end of said mandrel for applying filament containing strands to said tubular element, and a matrix curing device operatively associated with said base means and being located so that the tubular element with strands thereon extends thereinto for curing the strands thereon into a relatively rigid tubular member.

2. The apparatus of claim 1 further characterized in that said in-situ mandrel forming means comprises means for wrapping a flexible sheet about said mandrel so that the sheet substantially envelops a portion of the mandrel, and means for curing said flexible sheet and rendering the same substantially rigid.

3. The apparatus of claim 2 further characterized in that means is provided for sealing the longitudinal margins of said flexible sheet.

4. The apparatus of claim 1 further characterized in that said in-situ mandrel forming means comprising a wrapping tube disposed about said mandrel for wraing a flexible sheet about said mandrel so that said sheet substantially envelops a portion of the mandrel, said tube having a decreasing radius of duration with respect to its central longitudinal axis, means for sealing the margins of said sheet when wrapped about said mandrel, and means for curing said flexible sheet to render the same substantially rigid to serve as an in-situ mandrel.

5. The apparatus of claim 1 further characterized in that said in-situ mandrel forming means comprises at least one station for applying longitudinal filament containing strands to said mandrel and at least one station for applying strands about said longitudinal strands, means for resin impregnating said strands, and means for curing said strands to form a rigid tubular element and thereby serve as an in-situ mandrel.

6. An apparatus for producing filament reinforced tubular members, said apparatus comprising base means, a fixed rigid mandrel operatively mounted on said base means in a cantilever position, in-situ mandrel forming means for forming a tubular element on said mandrel and which element has sufficient internal strength for having filament strands applied thereto for serving as a movable in-situ mandrel, said mandrel having a smooth surface, motion means for shifting said tubular element and any strands applied thereto along said mandrel during the application of the strands thereto, said motion means removing said tubular element and any strands applied thereto from said mandrel and beyond the terminal end thereof, and past a series of successive strand application stations, said successive strand application stations including a first station located for applying longitudinally located filament containing strands to said tubular element which moves past said first station, impregnating means operatively associated with said base means for impregnating said strands with a matrix curable material, at least one second winding station operatively associated with said base means for wrapping filament containing strands about said longitudinal strands, and a matrix curing device operatively associated with said base means and being located so that the tubular element with strands thereon extends thereinto for curing the strands thereon into a relatively rigid tubular member.

7. The apparatus of claim 6 further characterized in that a third winding station is operatively associated with said base means and being located beyond said second winding station, means at said third winding station for operatively wrapping filament strands about said longitudinal strands but in an opposite direction with respect to the strands applied at said second station.

8. The apparatus of claim 7 further characterized in that said first and second winding stations are capable of wrapping helical strands about said longitudinal strands.

9. The apparatus of claim 8 further characterized in that a fourth winding station is located beyond said third winding station, and means as said third station for wrapping circumferential strands about said helical strands.

10. The apparatus of claim 1 further characterized in that said apparatus is mounted on a moving vehicle for continuously laying said tubular member from the vehicle.

11. The apparatus of claim 1 further characterized in that said mandrel and tubular element formed thereon is noncircular in cross section having two opposed walls that are sized and located in such manner to receive the major portion of the loingitudinal strands applied to said tubular element.

12. An apparatus for producing filament reinforced tubular members of noncircular cross section, said apparatus comprising a fixed rigid mandrel having two opposed walls and being supported in a cantilever position, a first strand application station operatively associated with said mandrel for applying longitudinally located filament containing strands to said fixed rigid mandrel, means at said first application station to apply the longitudinally located strands to the mandrel in such manner that the major portion of the longitudinally located strands are applied to the two opposed walls, a second strand application station located with respect to said first station for wrapping filament containing strands about said longitudinal strands and enveloping a portion of said longitudinal strands, impregnating means for impregnating said strands with a matrix curable material, a matrix curing device located so that said fixed mandrel extends into said matrix curing device to form a relatively rigid tubular member on said mandrel, and motive means for urging said tubular member through said matrix curing device and off of said mandrel whereby a noncircular filament reinforced tubular member is continuously formed on said mandrel, cured and removed therefrom.

13. The apparatus of claim 12 further characterized in that said matrix curing device is a radio frequency powered curing device.

14. An apparatus for producing filament reinforced tubular members, said apparatus comprising a first strand application station, a fixed rigid mandrel extending past said first strand application station in a cantilever position, means at said first strand application station for operatively applying filament containing strands to said fixed rigid mandrel, first impregnating means for impregnating said strands with a matrix curable material, first matrix curing means for curing said matrix in impregnated strands to form an in-situ tubular element on said mandrel, motive means urging said in-situ tubular element off of said mandrel, at least one second strand application station located to receive the in-situ tubular element, means at said additional strand application station for applying filament containing strands about said in-situ tubular element and enveloping a portion of said tubular element, second impregnating means for impregnating said last-named strands with a matrix curable material, second matrix curing means located to cure said last-named strands and thereby form a relatively rigid tubular member, whereby a filament reinforced tubular member is continuously formed, cured and removed from said apparatus.

15. The apparatus of claim 14 further characterized in that said curing means are dielectric curing means.

16. The apparatus of claim 14 further characterized in that a third strand application station is also provided and is located so that it wraps strands about the strands applied at said second strand application station.

17. An apparatus for producing filament reinforced tubular members, said apparatus comprising a fixed rigid mandrel mounted in a cantilever position, a first strand application station for applying longitudinally located filament strands to the fixed rigid mandrel, motive means for removing said element from said mandrel and beyond the terminal end thereof, at least one second strand application station for applying filament containing strands to said longitudinally located filament strands, a resin matrix impregnating canister located to receive the mandrel and strands thereon means in said impregnator for forcibly impregnating the strands on said mandrel with a resin matrix by sonic energy, and a matrix curing device located so that the filament strands extend thereinto for curing the matrix impregnated strands into a relatively rigid tubular member.

18. An apparatus for producing filament reinforced tubular members and subaqueously depositing said filament reinforced tubular members, said apparatus comprising base means, a fixed rigid mandrel operatively mounted on said base means in a cantilever position, in-situ mandrel forming means for forming a tubular element on said mandrel and which element has sufficient internal strength for having filament strands applied thereto for serving as a movable in-situ mandrel, said mandrel having a smooth surface, motion means for readily shifting said tubular element and any strands applied thereto along said mandrel during the application of the strands thereto, said motion means removing said tubular element and any strands applied thereto from said mandrel and beyond the terminal end thereof, at least one strand application station located beyond the terminal end of said mandrel for applying filament containing strands to said tubular element, and a matrix curing device operatively associated with said base means and being located so that the tubular element with strands thereon extends thereinto for curing the strands thereon into a relatively rigid tubular member.

19. The apparatus of claim 18 further characterized in that a braking unit is also operatively associated with said apparatus for controlling the rate of speed of removal of the tubular member from the mandrel.

References Cited
UNITED STATES PATENTS

| | | | |
|---|---|---|---|
| 2,803,730 | 8/1957 | Kinghorn | 156—274X |
| 3,306,797 | 2/1967 | Boggs | 156—173X |
| 3,336,176 | 8/1967 | Medney | 156—431X |
| 3,376,181 | 4/1968 | Larson et al. | 156—244X |
| 3,407,107 | 10/1968 | Skoggard et al. | 156—432 |

CARL D. QUARFORTH, Primary Examiner
E. E. LEHMANN, Assistant Examiner

U.S. Cl. X.R.
156—274, 432